United States Patent
Fujioka et al.

(10) Patent No.: US 7,300,344 B2
(45) Date of Patent: Nov. 27, 2007

(54) VIDEO GAME APPARATUS, A CHARACTER TRAINING CONTROLLING METHOD, AND A READABLE STORAGE MEDIUM STORING CHARACTER TRAINING CONTROL PROGRAMS

(75) Inventors: Kenji Fujioka, Nishinomiya (JP); Hideto Inoue, Ashiya (JP); Naoki Nishikawa, Kobe (JP); Hiroshi Miyaoka, Osaka (JP)

(73) Assignee: KCEO Inc., Osaka-fu (JP)

( * ) Notice: Subject to any disclaimer, the term of this patent is extended or adjusted under 35 U.S.C. 154(b) by 276 days.

(21) Appl. No.: 09/736,107

(22) Filed: Dec. 13, 2000

(65) Prior Publication Data

US 2001/0005689 A1    Jun. 28, 2001

(30) Foreign Application Priority Data

Dec. 14, 1999  (JP)  ................... 11-355202

(51) Int. Cl.
*A63F 13/00*    (2006.01)
(52) U.S. Cl. ................ 463/4; 463/31; 463/43
(58) Field of Classification Search .............. 463/40, 463/41, 42, 43, 44, 1, 7; 273/148 B
See application file for complete search history.

(56) References Cited

U.S. PATENT DOCUMENTS

| | | | | |
|---|---|---|---|---|
| 4,858,930 A | * | 8/1989 | Sato ............................ | 463/23 |
| 5,048,831 A | * | 9/1991 | Sides ......................... | 358/1.17 |
| 5,390,937 A | * | 2/1995 | Sakaguchi et al. ............ | 463/7 |
| 5,580,308 A | * | 12/1996 | Nakamura ..................... | 463/7 |

(Continued)

FOREIGN PATENT DOCUMENTS

EP    0844010    5/1998

(Continued)

OTHER PUBLICATIONS

Unknown Author, Pokemon Red/Blue version, 1998, Nintendo, Red/Blue version, [online] [retrieved on Aug. 5, 2003] Retrieved from the Internet:<URL:http://www.world-of-nintendo.com/manuals/game_boy/pokemon.shtml>, see entire document.*

(Continued)

*Primary Examiner*—Robert E. Pezzuto
*Assistant Examiner*—William H McCulloch
(74) *Attorney, Agent, or Firm*—Jordan and Hamburg LLP

(57) ABSTRACT

A character training control includes setting a character to be trained and its training initial values when a training mode is instructed; obtaining training values to be added to the training initial values of the character by causing the set character to take actions on a monitor in line with a training purpose according to the operation of a plurality of operable buttons; giving a plurality of kinds of items to the character which are prepared in advance and influential to sums of the training values in relation to at least one of the trained state of the character and action instructing operations given to the character by the operable buttons; judging whether training has been successful; and transferring the data of the successfully trained character to the external side together with the training initial values and the given items when a transfer mode is instructed. The control enables realization of an interesting and ingenious game.

32 Claims, 32 Drawing Sheets

U.S. PATENT DOCUMENTS

| | | | | |
|---|---|---|---|---|
| 5,662,332 | A * | 9/1997 | Garfield | 273/308 |
| 5,885,156 | A * | 3/1999 | Toyohara et al. | 463/1 |
| 5,971,855 | A * | 10/1999 | Ng | 463/40 |
| 6,009,458 | A * | 12/1999 | Hawkins et al. | 709/203 |
| 6,165,068 | A * | 12/2000 | Sonoda et al. | 463/40 |
| 6,213,871 | B1 * | 4/2001 | Yokoi | 273/460 |
| 6,227,966 | B1 * | 5/2001 | Yokoi | 446/143 |
| 6,251,012 | B1 * | 6/2001 | Horigami et al. | 273/148 B |
| 6,270,416 | B1 * | 8/2001 | Komoto | 463/43 |
| 6,273,814 | B1 * | 8/2001 | Komoto | 463/7 |
| 6,273,815 | B1 * | 8/2001 | Stuckman et al. | 434/238 |
| 6,314,483 | B1 * | 11/2001 | Goto et al. | 361/683 |
| 6,371,856 | B1 * | 4/2002 | Niwa | 463/43 |
| 6,406,372 | B1 * | 6/2002 | Turmell et al. | 463/43 |
| 6,656,049 | B1 * | 12/2003 | Masaki et al. | 463/36 |
| 7,077,751 | B2 * | 7/2006 | Nishiyama et al. | 463/43 |
| 2002/0072408 | A1 * | 6/2002 | Kumagai | 463/31 |

FOREIGN PATENT DOCUMENTS

| | | |
|---|---|---|
| JP | 10-314454 | 12/1998 |
| JP | 11-249544 | 9/1999 |
| JP | 11-290552 | 10/1999 |
| WO | WO9845005 | 10/1998 |

OTHER PUBLICATIONS

"PocketStation FAQ v1.3" 'ONLINE!' Oct. 27, 1998, pp. 1-3.

* cited by examiner

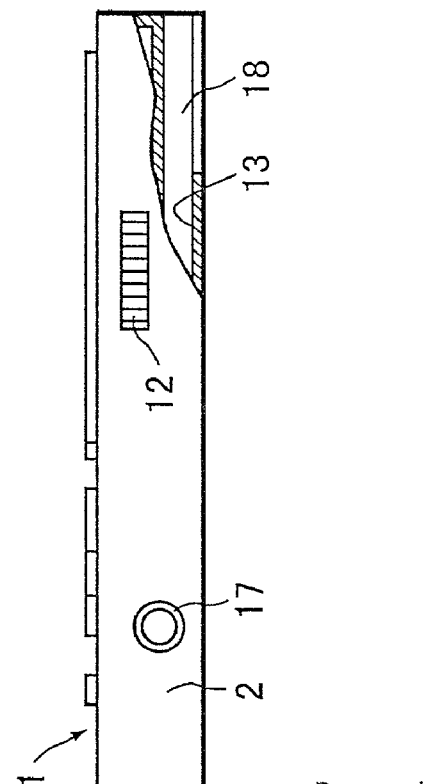
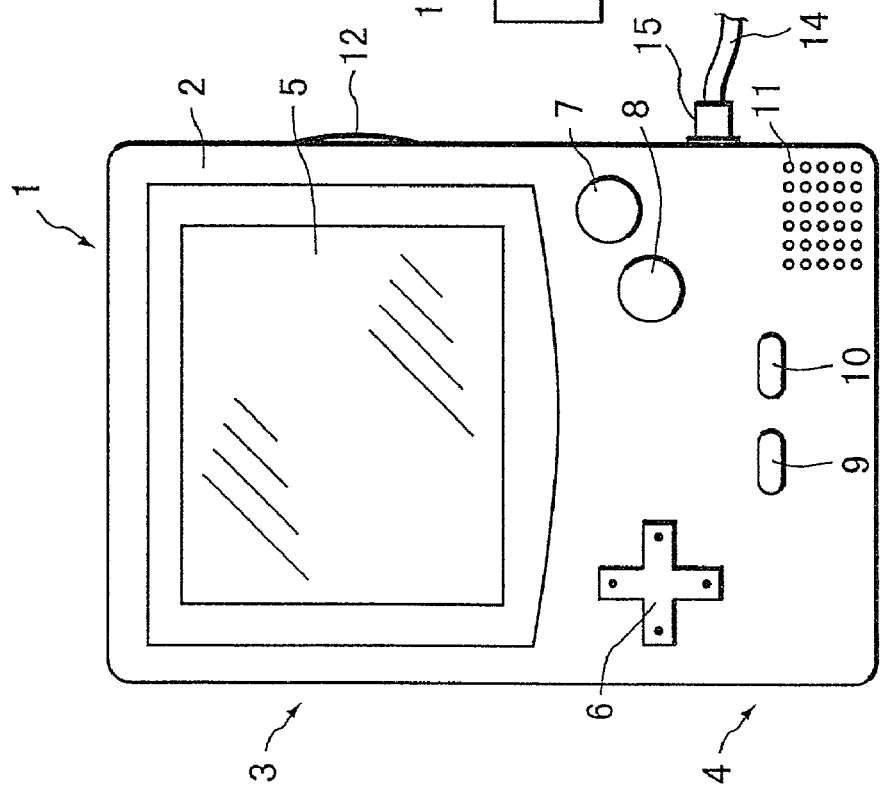

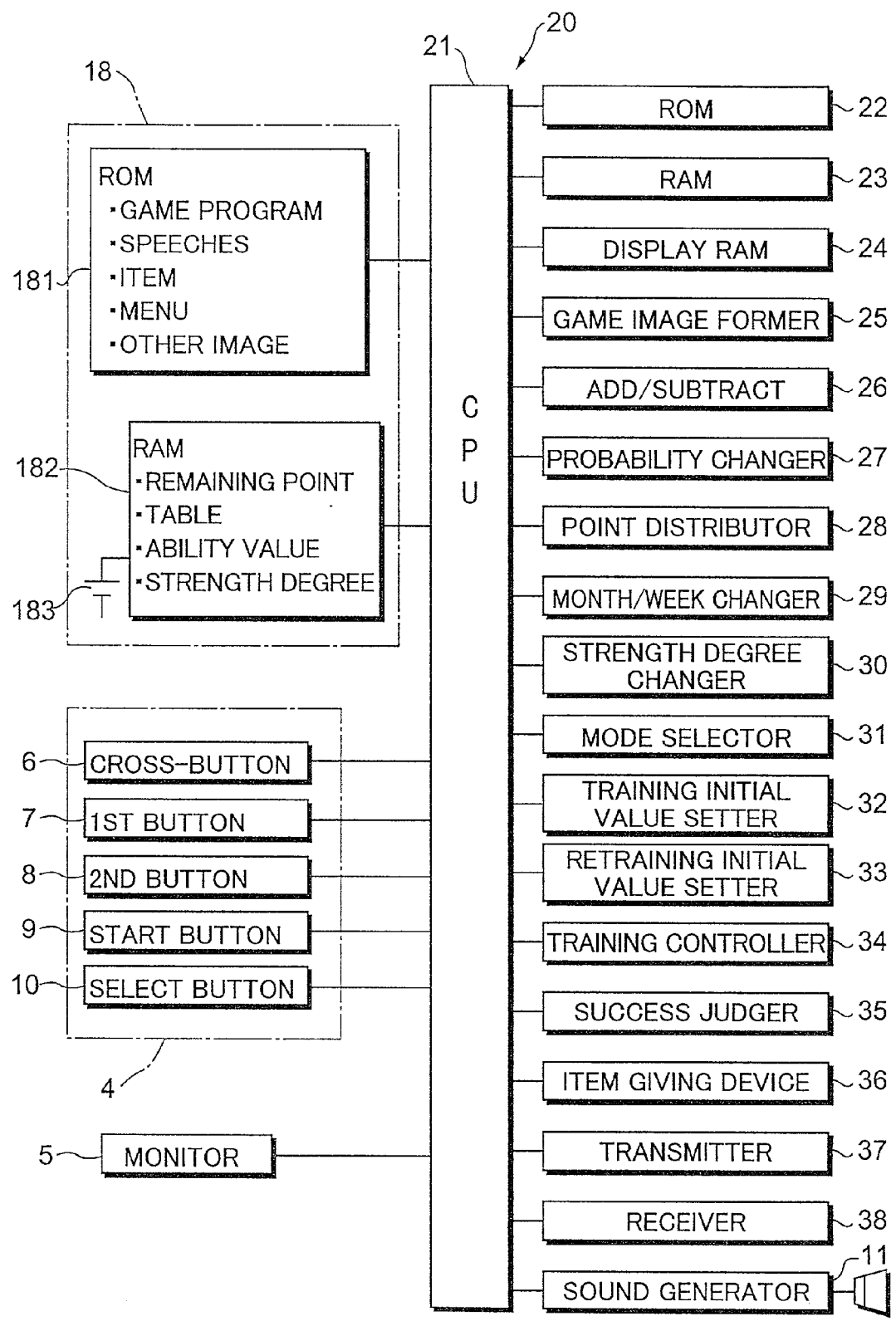

FIG.3

PLAYER CREATION

DETERMINE GROWTH TYPE

| AUTOMATIC GROWTH TYPE | | GROWN BY COMPUTER |
|---|---|---|
| | COMPUTER-SETTING TYPE | GROWN ON THE AVERAGE |
| | VERSATILE TYPE | IMPORTANCE GIVEN TO ON-BASE PERCENTAGE, ACTIVE POWER |
| | FIRST BATTER TYPE | IMPORTANCE GIVEN TO ON-BASE PERCENTAGE, BUNTING POWER |
| | SECOND BATTER TYPE | IMPORTANCE GIVEN TO GENERAL BATTERY POWER |
| | THIRD BATTER TYPE | IMPORTANCE GIVEN TO PHYSICAL POWER |
| | FOURTH BATTER TYPE | IMPORTANCE GIVEN TO FIELDING POWER |
| | EIGHTH BATTER TYPE | |
| MANUAL GROWTH TYPE | MANUAL | GROWN BY VIDEO GAME PLAYER |

FIG.4

PLAYER CREATION

NAME SMITH

| TEAM | OLEX |
|---|---|
| CALLING HIMSELF | WATASHI |
| RIGHT- OR LEFT-HANDED | RIGHT-HANDED THROWER LEFT-HANDED BATTER |

RIGHT- OR LEFT-HANDED

| FIELD POSITION | |
|---|---|
| FORM | |
| HOBBY | |

FINISHED

RIGHT-HANDED THROWER, RIGHT-HANDED BATTER
RIGHT-HANDED THROWER, LEFT-HANDED BATTER
RIGHT-HANDED THROWER, SWITCH-HITTER
LEFT-HANDED THROWER, RIGHT-HANDED BATTER
LEFT-HANDED THROWER, LEFT-HANDED BATTER
LEFT-HANDED THROWER, SWITCH-HITTER

FIG.12

HITTING AT PITCHER

5TH TIME AT BAT

SWINGING WIDE

THREE STRIKES

HIT

FIG.14

| REMAINING EXPERIENCE POINTS | | MUSCLE POWER | ABILITY UP ABILITY | TECHNIQUE |
|---|---|---|---|---|
| | | 36 | 65 | 44 |

| RETURN | | | PRESENT ABILITY | | ABILITY AFTER CHANGED | |
|---|---|---|---|---|---|---|
| MEET CIRCLE | 10 | 20 | D | | D | |
| HITTING POWER | 4 | | 65 | | → 65 | |
| RUNNING POWER | 40 | 10 | 8 D | | → 8 D | |
| SHOULDER POWER | 24 | 5 | 8 D | | → 8 D | |
| FIELDING | 10 | 32 | 8 D | | → 8 D | |
| CHANCE | 15 | 15 | | | | |

MEET CURSOR SIZE UPON HITTING

FIG.15

| REMAINING EXPERIENCE POINTS | MUSCLE POWER | ABILITY | TECHNIQUE |
|---|---|---|---|
| | 0 | 2 | 2 |

ABILITY UP

| | | | |
|---|---|---|---|
| FOR LEFT-HANDED PITCHER | 15 | 15 | 15 |
| BUNTING | | | 30 |
| INFIELD HIT | 80 | 80 | 40 |
| POWER HITTER | 30 | 20 | 30 |
| AVERAGE HITTER | | 20 | 30 |
| HEAD SLIDING | | 20 | 20 |
| STOLEN BASE | | | |

PRESENT ABILITY

ABILITY AFTER CHANGED

SLIDE ONTO 1ST BASE AT CRITICAL MOMENT

FIG.16

| REMAINING EXPERIENCE POINTS | MUSCLE POWER | ABILITY | ABILITY UP TECHNIQUE |
|---|---|---|---|
| 4 | 50 | 7 |

| RETURN | | PRESENT ABILITY | ABILITY AFTER CHANGED |
|---|---|---|---|
| MEET CIRCLE | 10 | D | D |
| HITTING POWER | 4 | 40 | 30 | 65 | → 67 |
| RUNNING POWER | | 5 | 10 | 8 D | → 8 D |
| SHOULDER POWER | 24 | 10 | 5 | 8 D | → 8 D |
| FIELDING | | | 32 | 8 D | → 8 D |
| CHANCE | ACHIEVED | | |

POWER TO THROW BALL FAR AWAY

VIDEO GAME APPARATUS, A CHARACTER TRAINING CONTROLLING METHOD, AND A READABLE STORAGE MEDIUM STORING CHARACTER TRAINING CONTROL PROGRAMS

BACKGROUND OF THE INVENTION

This invention relates to a video game apparatus for letting a video character on a video screen to have a virtual experience (role-playing) instead of a game player, a character training control method, and a readable storage medium storing game programs.

As role-playing games in which a video character (hereinafter, merely "character") on a video screen has a virtual experience in a simulated atmosphere, growth type games are known in which a main character grows while repeating fights or competitions with other characters in various scenes. In the case of games of this type, gaming characteristics are improved by giving different abilities and personalities to the respective characters. Further, there are also known games in which personalities are given to characters by allocating a plurality of kinds of abilities in a total ability value for each character.

However, in the above growth type games, various abilities are improved by fighting or competing with opponent characters, but factors considered for the growth of the abilities depend only on the fighting or competing states with the opponent characters. Thus, the same or similar results are always obtained, making the game less interesting. Further, in the games in which various abilities are allocated to the characters, characters having abilities set based on the instruction of the game player can merely be obtained. Thus, the games lack variety, becoming less interesting.

SUMMARY OF THE INVENTION

It is an object of the present invention to provide a video game apparatus, a character training control method and a readable storage medium storing game programs which enable realization of a highly interesting and ingenious game by enabling a character trained by a game player to be retrained on other sides.

According to an aspect of the invention, a video game apparatus is provided with a monitor for displaying game images, a plurality of operable members for operating the game images including a character displayed on the monitor. Further, there are provided a data transmitter for transmitting data to an external side, a mode instructing member for selectively instructing a training mode and a transfer mode, a first setter for setting a character to be trained and its training initial values when the training mode is instructed, a training controller for obtaining training values to be added to the training initial values of the set character by causing the character to take actions in line of a training purpose according to the operation of the plurality of operable members, an item giving device for giving a plurality of kinds of items to the character which are prepared in advance and influential to sums of the training values in relation to at least one of the trained state of the character and action instructing operations given to the character by the operable members, and a judger for judging whether training has been successful. Data of the successfully trained character are transmitted to the external side by the data transmitter together with the training initial values when the transfer mode is instructed. Further, it may be preferable to transmit the data of the successfully trained character to the external side by the data transmitter together with the given items in addition to the training initial values when the transfer mode is instructed.

Also, the invention is directed to a character training control method for training a character by operating game images including a character displayed on a monitor by a plurality of operable members. The method comprises the steps of: setting a character to be trained and its training initial values when a training mode is instructed; obtaining training values to be added to the training initial values of the character by causing the set character to take actions on the monitor in line with a training purpose according to the operation of the plurality of operable members; giving a plurality of kinds of items to the character which are prepared in advance and influential to sums of the training values in relation to at least one of the trained state of the character and action instructing operations given to the character by the operable members; judging whether training has been successful; and transferring the data of the successfully trained character to an external side together with the training initial values when a transfer mode is instructed. Further, in the transfer of the data, the given items may be transferred to the external side in addition to the training initial values.

Moreover, the invention is directed to a readable storage medium storing a video game program which includes a character training control program comprising the steps of: setting a character to be trained and its training initial values when a training mode is instructed; obtaining training values to be added to the training initial values of the character by causing the set character to take actions on the monitor in line with a training purpose according to the operation of the plurality of operable members; giving a plurality of kinds of items to the character which are prepared in advance and influential to sums of the training values in relation to at least one of the trained state of the character and action instructing operations given to the character by the operable members; judging whether training has been successful; and transferring the data of the successfully trained character to an external side together with the training initial values when a transfer mode is instructed. Further, in the transfer of the data, the given items may be transferred to the external side in addition to the training initial values.

These and other objects, features and advantages of the present invention will become more apparent upon a reading of the following detailed description and accompanying drawings.

BRIEF DESCRIPTION OF THE DRAWINGS

FIG. 1A is a plan view showing a construction of a video game apparatus according to an embodiment of the invention;

FIG. 1B is a side view of the video game apparatus;

FIG. 2 is a block diagram showing a control system of the video game apparatus shown in FIGS. 1A and 1B;

FIGS. 3 to 17 are diagrams showing game screens displayed on a monitor of the video game apparatus shown in FIGS. 1A and 1B;

DETAILED DESCRIPTION OF THE PREFERRED EMBODIMENTS OF THE INVENTION

Figure 5:
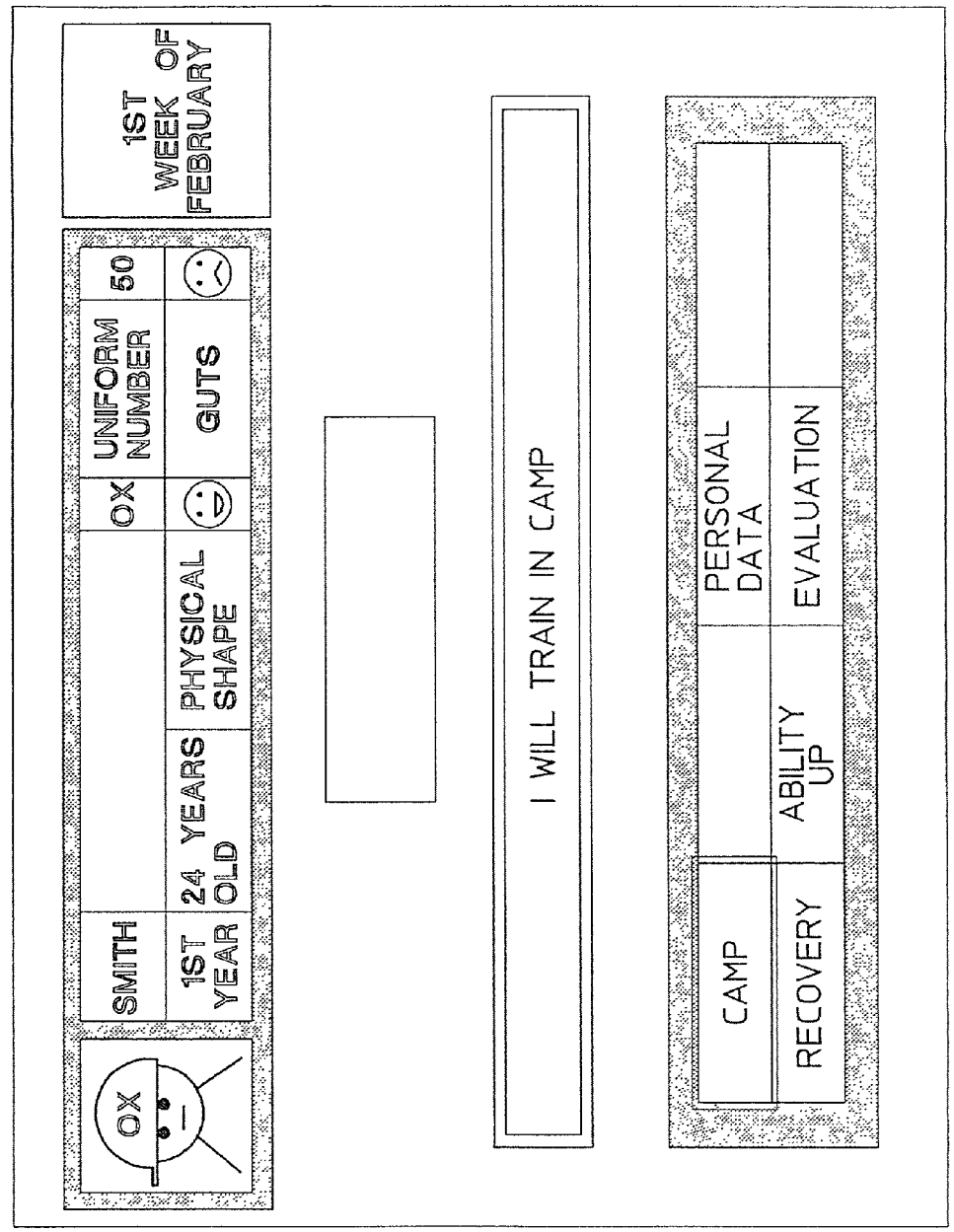

FIGS. 1A and 1B are a plan view and a side view showing a construction of a video game apparatus to which a character training controlling method according to an embodiment of the invention is applied. In FIGS. 1A and 1B, a video game apparatus 1 is a portable game apparatus which can be freely carried around and is constructed such that a single-play in which a game player competes with a computer and a dual-play in which two game players compete with each other by connecting two game apparatus via a communication cable are selectable, and a character trained in one game apparatus can be transferred to an other game apparatus. The video game apparatus 1 is provided with an outer casing 2 having a built-in controller and the like, a display unit 3 formed on an upper part of the front surface of the outer casing 2, and an operation unit 4 formed on a bottom part of the front surface of the outer casing 2.

In the display unit 3 is arranged a monitor 5 formed of a liquid crystal panel or the like for displaying game images. The operation unit 4 includes a cross-button 6 provided on the left side, first and second push buttons 7, 8 provided on the right side, and a start button 9 and a select button 10 provided below and between the cross-button 6 and the first and second push buttons 7, 8.

A sound generator 11 is provided at the bottom right corner of the front surface of the outer casing 2, and a volume adjusting member 12 is provided on the right side surface of the outer casing 2. Further, a ROM-cassette mounting portion 13 is formed in the upper half of the rear surface of the outer casing 2, and a female connector 17 connectable with a male connector 15 mounted at the leading end of a communication cable 14 for connecting two game apparatus is provided on the right side surface of the outer casing 2. In this embodiment, a baseball game is played in the video game apparatus 1, and a success game in which a rookie selected by the game player is trained to make it up from the farm or second team to the first team, a competition game in which a team made up of players trained by the game player plays a game with an opponent team, and other games can be played.

The monitor 5 selectively displays a game mode selection screen, screens used to input various data and the like if necessary before the start of the game, and suitably displays a plurality of game images and the like after the start of the game. The cross-button 6 has four direction instructing sections, which are operated, for example, in combination with the first and second push buttons 7, 8 to register individual data of the respective players and perform specified operations. The cross-button 6 is also used to move a hit cursor for adjusting a hitting position of a batter, to designate a base of base running, to designate the type of ball thrown by a pitcher and to designate movements of the respective players and a base to which the ball is supposed to be thrown.

The first push button 7 is used, for example, to cause a batter to swing and, when being operated together with the cross-button 6, the first push button 7 is used to cause a runner to return to a designated base, to instruct the pitcher to start throwing and to cause a fielder to make a fine play. Further, the second push button 8 is used, for example, to designate swing of the bat to one of normal swing and strong swing and, when being operated together with the cross-button 6, the second push button 8 is used to cause a runner to steal a base, to designate a base to which a pick-off throw should be made and to relay the throw.

Besides starting the game, the start button 9 is used, for example, to designate a bunt and to designate an exchange of the pitcher or the fielder when being operated together with the cross-button 6. Besides designating a game mode, the select button 10 is used, for example, to return the hit cursor to a center position of the base.

The sound generator 11 is formed by building a speaker inside the outer casing 2 and adapted to output a specified game music, sound effects and the like as the game progresses. The volume adjusting member 12 is adapted to adjust the volumes of the game music, sound effects and the like outputted from the speaker. A ROM cassette 18 is detachably mountable in the ROM-cassette mounting portion 13. A connector is provided in the ROM-cassette mounting portion 13 and a connector mounted at the leading end of the ROM cassette 18 is inserted thereinto to electrically connect the ROM cassette 18 with the controller inside.

In the video game apparatus 1 thus constructed, the success game, the competition game or other game can be played by pushing the cross-button 6 by the thumb of the left hand and suitably selectively pushing the first and second push buttons 7, 8, the start button 9 and/or the select button 10 by the right hand while the left and right sides of the outer casing 2 are held by both hands. A dual-competition game can be played by connecting two video game apparatus 1 via the communication cable 14. In the case of the success game, a player (player data) trained in one video game apparatus 1 can be transferred to the other video game apparatus 1 in a specific state to be described later, and can be retrained in the other video game apparatus 1.

FIG. 2 is a block diagram showing an exemplary control system of the video game apparatus 1. FIG. 2 shows the control system centering on the success game for training a rookie baseball player or character. Accordingly, in the case that another game stored in the ROM cassette 18 is played, e.g. in the case of the competition game, various control means in conformity with the baseball rules are necessary. In FIG. 2, a controller 20 performs a game processing in response to a command corresponding to the operation content of the operation unit 4 based on the game program stored in the ROM cassette 18 and various data including various image data forming a game space, and includes a CPU 21 for performing calculations, a ROM 22 for storing a control program and the like for controlling the display on the monitor 5, and a RAM 23 for temporarily storing processed data.

The CPU 21 is connected with the monitor 5, the cross-button 6, the first and second push buttons 7, 8, the start button 9, the select button 10, the sound generator 11 and the ROM cassette 18. The CPU 21 is further connected with a display RAM 24, a game image former 25, an adding/subtracting device 26, a probability changer 27, a remaining experience point distributor 28, a month/week changer 29, a physical/mental strength degree changer 30, a mode selector 31, a training initial value setter 32, a retraining initial value setter 33, a training controller 34, a training success judger 35, an item giving device 36, a transmitter 37 and a receiver 38.

The ROM cassette 18 includes a ROM 181 for storing various game programs, speeches of a main character (player to be trained) including sentences expressing contents of speaking and images representing actions of the main character and other characters relating to him, items influential to the training of the main character, and other images including a basic screen and background screens, a RAM 182 for renewably storing various contents of a remaining experience point section (score section), addition/subtraction table, ability values and degrees of physical and mental strengths (physical condition, motivation), and a back-up battery 183 of the RAM 182. The items influential to the training result of the main character are described later.

One screen of image to be displayed on the display surface of the monitor 5 is written in the display RAM 24. For example, the image is alternately and repeatedly written in and read from the display RAM 24 in a cycle of 1/60 sec., so that stable images can be displayed on the monitor 5 due to the afterimage phenomenon.

The game image former 25 determines a game image in dependence on the operation contents of the cross-button 6, the first and second push buttons 7, 8, the start button 9 and the select button 10 of the operation unit 4, the game program stored in the ROM 181 and the content of the RAM 182, and forms a specified display image on the display RAM 24.

The adding/subtracting device 26 adds specified points to the "Remaining Experience Points" as a score by repeating various practices when the game player selects "Camp" from the screen to be described later and subtracts specified points from the "Remaining Experience Points" due to negative events which occur as the game progresses.

The probability changer 27 randomly sets probabilities of addition and subtraction by the adding/subtracting device 26. Records of the practicing state and events in the "month/week" are adopted as variable factors, and the above probabilities are set in view of these variable factors. For example, the probability is increased if the respective factors are changed in positive direction or bring about a positive result while being decreased in the opposite case (in the case of addition). Specifically, the probability may be increased or reduced the number of numerical values that agree with numerical values in a certain range.

The remaining experience point distributor 28 performs calculations when the "Remaining Experience Points" are allocated to the various "Abilities". The kinds of the "Remaining Experience Points" include "Muscular Strength", "Agility" and "Technique". The respective points are increased according to the type of practice done at the "Camp" and by the other factors. These points are described in detail later with reference to FIGS. 14 to 16.

The month/week changer 29 causes time to pass one week every time a specified operation button (first or second push button 7 or 8 or the like) of the operation unit 4 is operated. The physical/mental strength degree changer 30 expresses degrees of "Physical Condition" and "Motivation" by face marks, respectively. The degree of "Physical Condition" decreases due to an excessive practicing at the "Camp" and increases upon selection of "Recovery" on the menu screen or upon entering a hospital due to an injury or other cause. The degree of "Motivation" increases or decreases upon occurrence of an event at the "Camp" or upon selection of "Recovery" or "Telephone" on the menu screen.

The mode selector 31 has a training mode for training a rookie player registered by the game player and a transfer mode for transferring the trained player to an other video game apparatus, and a desired mode is selected by operating specified operation buttons of the operation unit 4.

The training initial value setter 32 sets the registered player as an object to be trained when the game player registers a rookie player (main character) to be trained by operating the specified operation buttons of the operation unit 4. The setter 32 sets basic abilities of the player (dominant hand, batting form, pitching form, fielding position, auxiliary fielding position, transfer number, pitcher type, etc.) together with attributes thereof (name, uniform number, serial No., etc. of the player) at the start of the game according to the operation of the specified operation buttons of the operation unit 4 by the game player. For example, the setter 32 may automatically set other items when the game player registers the name of the player. It should be noted that the basic abilities are referred to as training initial values in this embodiment.

The retraining initial value setter 33 sets the player as an object to be retrained when the player transferred after being trained in another video game apparatus is retrained. The setter 33 sets the basic abilities initially set in the previous video game apparatus and the items influential to the training results given to the player during the training process in the previous video game apparatus as basic abilities of the player at the start of the game in the other video game apparatus together with attributes.

The training controller 34 is adapted to obtain training values added to the training initial values (initial abilities of the object to be trained, etc.) by causing the registered player to take actions in line with the training purpose according to the operation of the specified operation buttons of the operation unit 4.

The training success judger 35 judges whether the rookie player registered by the game player has come to possess abilities (training values) set in advance by practicing various trainings or coping with various events and the like at the "Camp". When the rookie player comes to possess the abilities set in advance, the training of the player is judged to have been successful. In this embodiment, only when the training of the player was successful, he can be transferred to another video game apparatus to be retrained.

The item giving device 36 gives one or more items to the rookie player registered by the game player from a plurality of items set in advance when he takes a preset action upon selection of "Camp", "Recovery", "Telephone", etc., when a predetermined time or longer elapses upon taking a certain action, or when a cumulative value of a certain characteristic value becomes above or below a predetermined value. These items are positively or negatively influential to the training result of the player as described above (i.e. influence the sums of the training values to be described later by relating to at least one of the trained state of the player and action instructing operations given to the player by operating the specified operation buttons of the operation unit 4). In this embodiment, contents as shown in TABLE below are set, for example, as items.

TABLE 1

| | |
|---|---|
| LIVES OF BASEBALL GREATS | GIVE SPECIAL ABILITIES (WIDE-ANGLE BATTING FORM, HEAVY BALL, SENSE O) |
| LIVES OF BASEBALL ORDINARIES | GIVE SPECIAL ABILITIES (STRIKEOUT MAN, IMMEDIATELY BEFORE x, SENSE x) |
| LUCKY BALL | +1 WHEN BREAKING PITCH POINT IS UP |
| CURSED BALL | −1 WHEN BREAKING PITCH POINT IS UP |
| QUICK SPIKES | +1 WHEN QUICKNESS POINT IS UP |
| SLOW SPIKES | −1 WHEN QUICKNESS POINT IS UP |
| FAR FLYING BAT | +1 WHEN MUSCULAR STRENGTH POINT IS UP |
| CROOKED BAT | −1 WHEN MUSCULAR STRENGTH POINT IS UP |
| RED WRIST BAND | GIVE SPECIAL ABILITY (LEFT-HAND PITCHER O) |
| WHITE WRIST BAND | GIVE SPECIAL ABILITY (LEFT-HAND PITCHER x) |

TABLE 1-continued

| | |
|---|---|
| NICE GLOVE | +1 WHEN TECHNICAL POINT IS UP |
| AILING GLOVE | −1 WHEN TECHNICAL POINT IS UP |
| LOCK-ON | EASIER TO FOLLOW A BALL AND BAT IT's |
| LOVE SCOPE | INFORMATION ON HER FAVOURABLE IMPRESSION CAN BE SEEN |
| LUCKY CHARM | AVOIDANCE OF ACCIDENT, ACCIDENT RATE −25% |
| CURSING DOLL | ACCIDENT RATE +1% |
| LEONE-X | +1 WHEN HER VAVOURABLE IMPRESSION IS UP |
| GANDER ROBO | +1 WHEN MANIAC POINT IS UP |
| GOMERA DOLL | DOUBLE MANIAC POINT WHEN IT IS UP |
| MARY'S FIGURE | MANIAC POINT +1 EVERY WEEK |
| CAR | INCREASE PLACES OF DATE, +1 TO 3 WHEN HER VAVOURABLE IMPRESSION IS UP |
| SECRET PICTURE | CHAPTER CAN ALWAYS BE CLEARED |
| MEDAL (GOLD) | GIVE SPECIAL ABILITY (OVER-POWERING FORCE) |
| MEDAL (SILVER) | PUBLIC EVALUATION, INITIAL VALUE 20 POINTS |
| VITAMIN | RECOVER PHYSICAL STRENGTH |
| MAGMA PIPE | CALL UP DR. DAIJOBU |
| SPECIFIC REMEDY | COMPLETELY RECOVER PHYSICAL SICKNESS |
| AMUSEMENT-VIDEO | RECOVER MOTIVATION |
| POWER-VITAMIN | RECOVER PHYSICAL STRENGTH, MOTIVATION, MENTAL SICKNESS |

Here, if the item of "Lives of Baseball Greats" is given, special abilities of acquiring a skill of wide-angle batting form, throwing a heavy ball, improving a gaming sense (sense O) are given to the player. If the item of "Lives of Baseball Ordinaries" is given, negative special abilities of having a higher strikeout rate (strikeout man), being removed from starting members immediately before the start of the game (immediately before x, having a reduced gaming sense (sense x) are given to the player.

Further, if the item of "Far Flying Bat" is given, "+1" is further added when the muscular strength point is up. Further, if the item of "Red Wrist Band" is given, an ability of being strong against left-hand pitchers (left-hand pitcher O) is given to the player. Further, if the item of "VITAMIN" is given, physical strength (PS) comes to be quickly recovered. In this embodiment, the player gets a "Girl Friend" after the training at the "Camp" or upon satisfying a specific condition while taking another action. By getting the "Girl Friend", various merits (e.g. "Lives of Baseball Greats" is given as a present from the "Girl Friend", items positively influential to the training result of the player are given with an increased frequency) can be obtained.

The transmitter 37 is adapted to transmit the data of the successfully trained player to another video game apparatus. The receiver 38 is adapted to receive the data of the player trained in another video game apparatus. Although data communication is conducted by connecting two video game apparatus 1 via the communication cable 14 in this embodiment, it may be done by a wireless method such as an infrared communication.

The game image former 25, the adding/subtracting device 26, the probability changer 27, the remaining experience point distributor 28, the month/week changer 29, the mental/physical degree changer 30, the mode selector 31, the training initial value setter 32, the retraining initial value setter 33, the training controller 34, the training success judger 35, the item giving device 36, etc. are constructed as function realizing means of the CPU 21.

Next, the respective game screens when the success game is selected are briefly described with reference to FIGS. 3 to 17. It should be noted that these game screens are only one example adopted to describe the success game, and the success game may be made up of other game screens. Further, when the success game is selected on the initial screen, a screen of FIG. 3 is displayed. This screen is used to register a rookie player, registration items roughly include "Automatic Growth Type" in which training of the player is left to the microcomputer and "Manual Growth Type". In the "Automatic Growth Type", "Versatile Type", "First Batter Type" to "Fourth Batter Type" and "Eighth Batter Type" are selectable.

FIG. 4 is a succeeding screen used to input individual data to specify the rookie player. The individual data include, for example, "Name", "Dominant Hand", "Fielding", "Form", etc. and content being presently set is displayed at the upper right. At the lower part are displayed data corresponding to the data where the cursor is located, so that desired data is selected by means of the cursor from these data. Other items may be automatically set, for example, by the game player registering the name of the main character.

Figure 6:
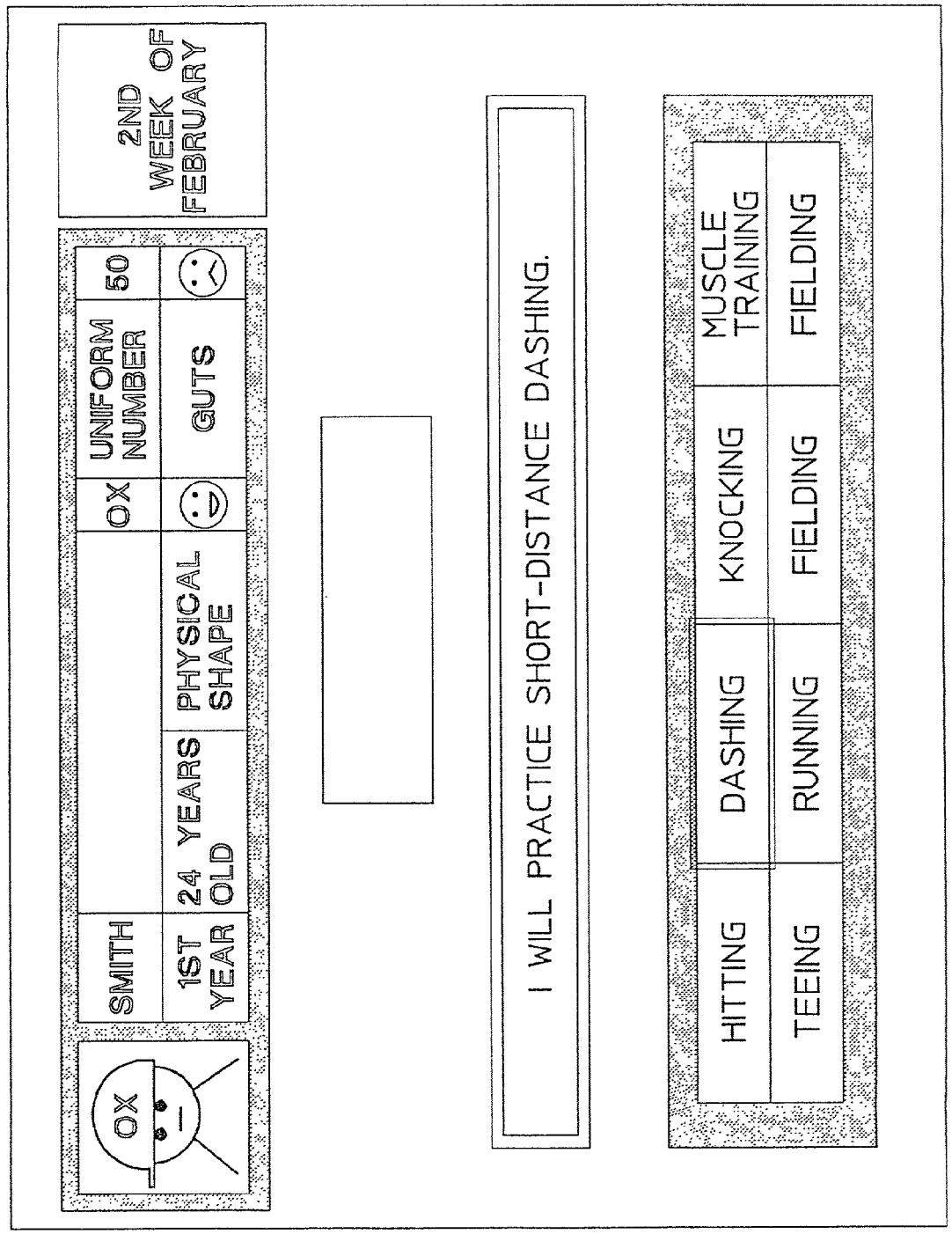

FIG. 5 is a succeeding screen for selectably displaying "Camp" (where the cursor is set), "Recovery", "Ability Up", "Individual Data", "Evaluation", etc. The cursor is set at the "Camp". FIG. 6 is a screen displayed when the "Camp" is selected, wherein training menus include "Batting", "Tee", "Dash" (where the cursor is set), "Running", "Knock", "Actual Game Fielding", "Muscle Training" and "Return". Depending on the respective training menus, the points of kinds of the "Remaining Experience Points" (see FIG. 15) which are scores are added or subtracted in accordance with the probability set by the probability changer 27. For example, if "Muscle Training" is selected, points of "Technique" may decrease although points of "Muscular Strength" increase. "Return" is used to return to the previous screen.

Different from the other elements, the "Remaining Experience Points" are increased or decreased in accordance with the probability set by the probability changer 27 in dependence upon the abilities of the player in "Batting". Specifically, a screen in which a batting pitcher throws is displayed, and the player is enabled to practice batting a specified number of balls. The "Remaining Experience Points" can be increased in accordance with the probability set by the probability setter 27 by moving the hit cursor MC (see FIG. 11, indicating an area where the ball hits the bat on its course) to the up, down, left and right by using the cross-button 6, and hitting the ball thrown from the batting pitcher by operating the first push button 7. The "Remaining Experience Points" are decreased when the thrown ball is missed by the operation of the first push button 7.

Figure 7:
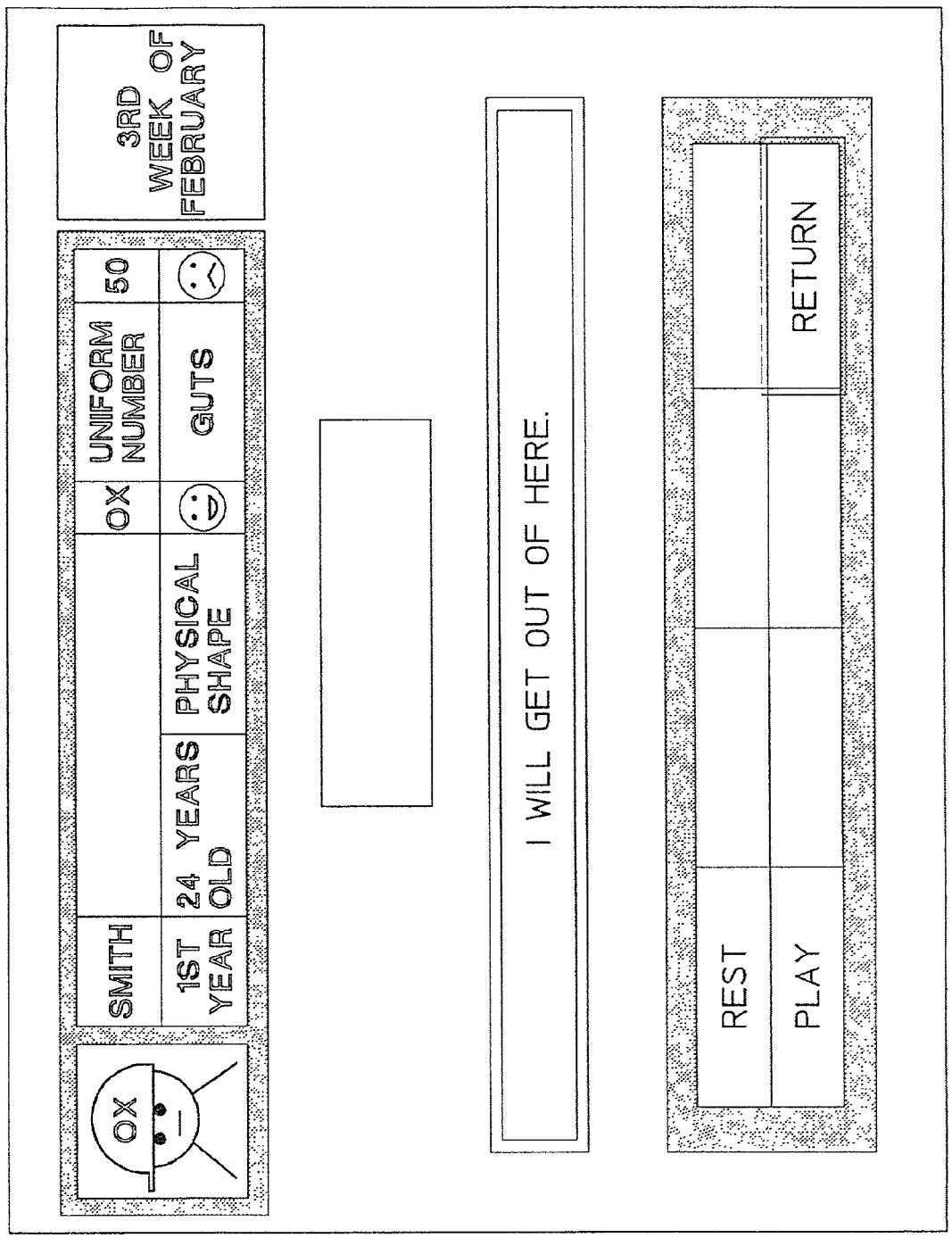
Figure 8:
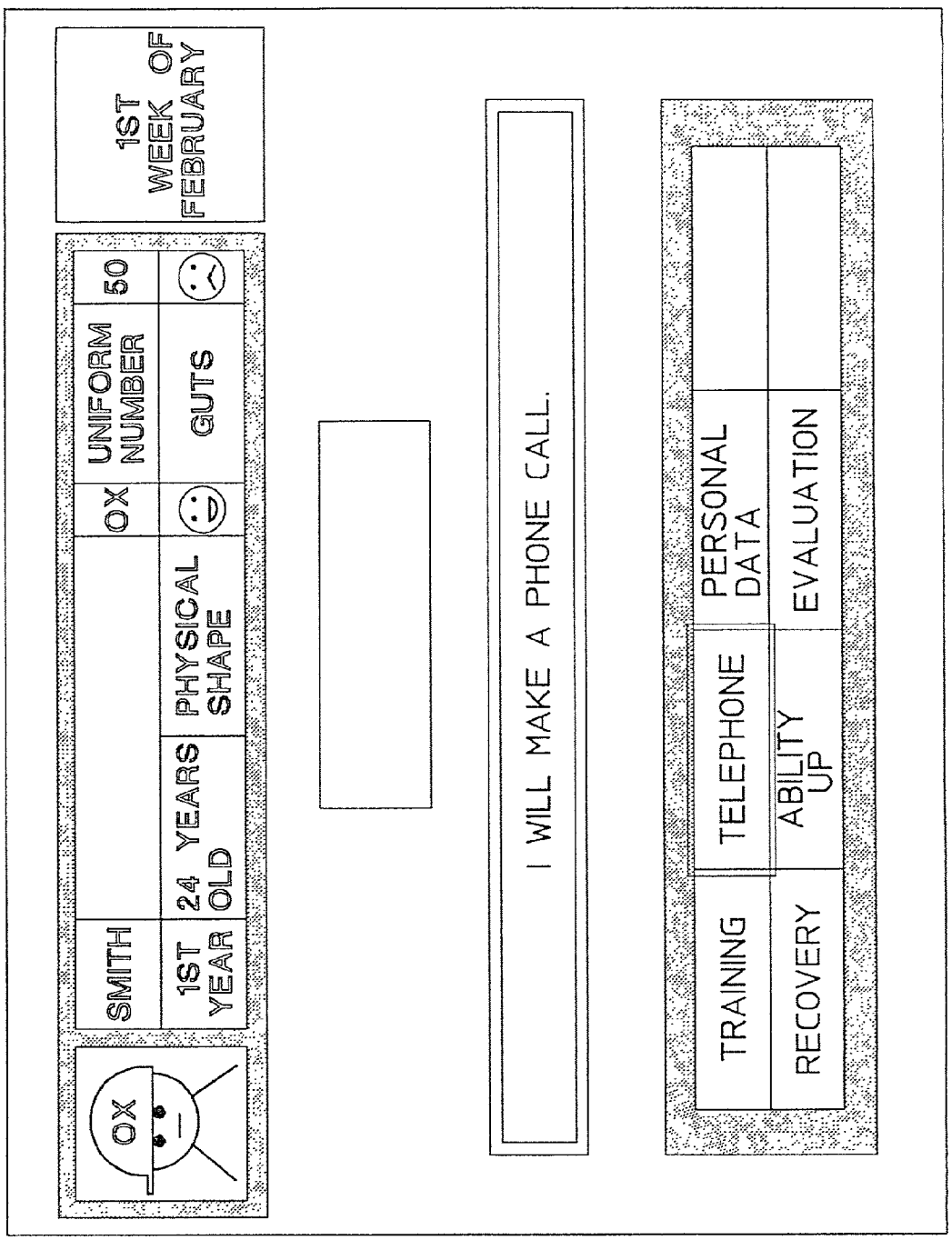

FIG. 7 is a screen displayed when "Recovery" is selected in the screen of FIG. 5, wherein "Rest", "Play" and "Return" are displayed. FIG. 8 shows a screen corresponding to that of FIG. 5, and differs from FIG. 5 in that "Telephone" displayed under various conditions is made selectable. Although not shown, if the player enters a hospital due to an injury as a negative event, "Recovery" and "Telephone" are displayed on this screen, but "Camp" is not displayed since it is not selectable.

Figure 9:
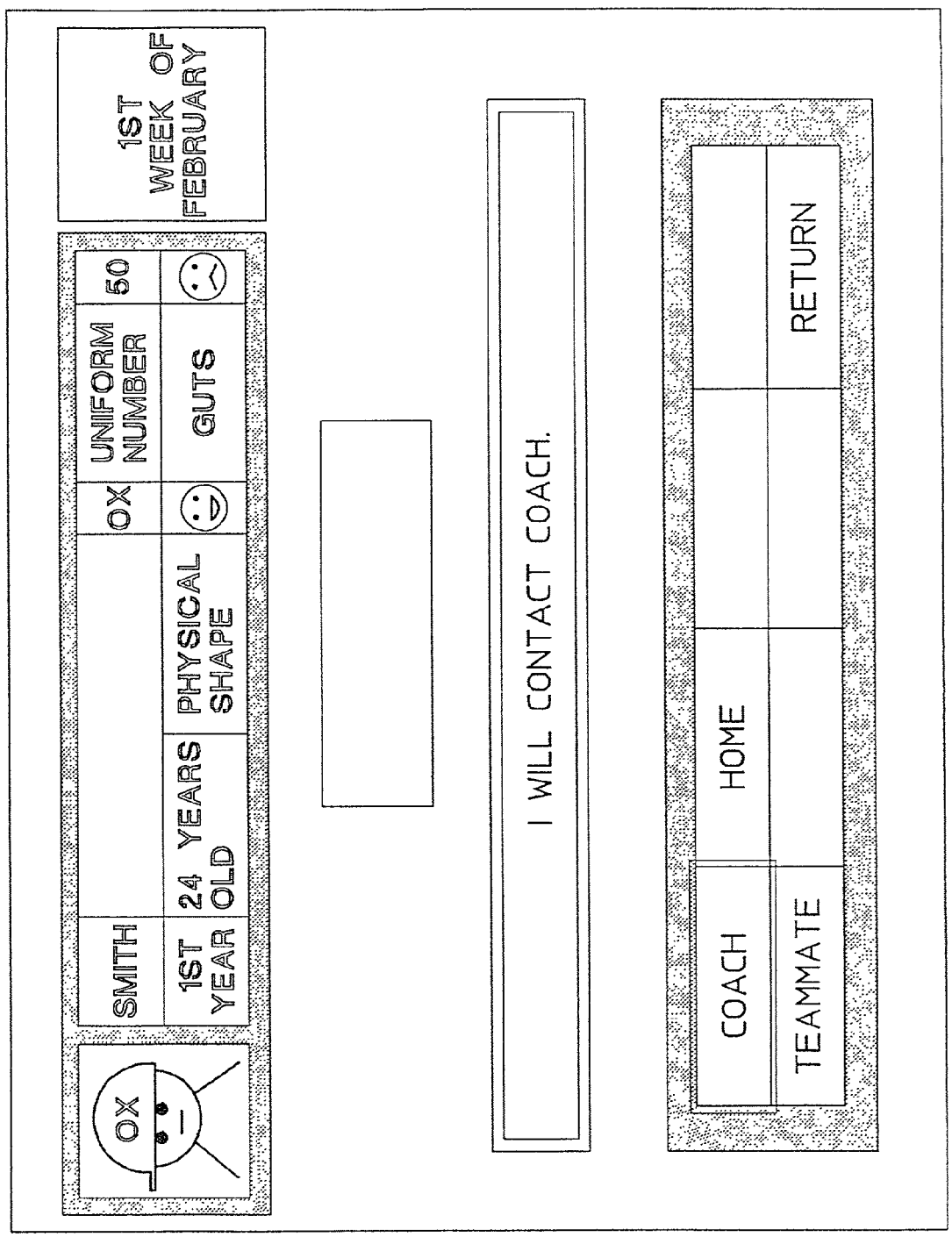

FIG. 9 is a screen displayed next when "Telephone" is selected in the screen of FIG. 8. The player can make a "Telephone" call to his "Coach", "Teammates" or "Family". If he calls his "Coach", there are various conversations to be made. Basically, other points decrease although the "Remaining Experience Points" increase. If he calls his "Teammate", the manager's evaluation on him increases. Further, if he calls his "Family", other points decreases although "Motivation" increases. These factors are controllably added or subtracted by the adding/subtracting device 26 in accordance with a change of the probability caused by the probability changer 27.

Figure 10:
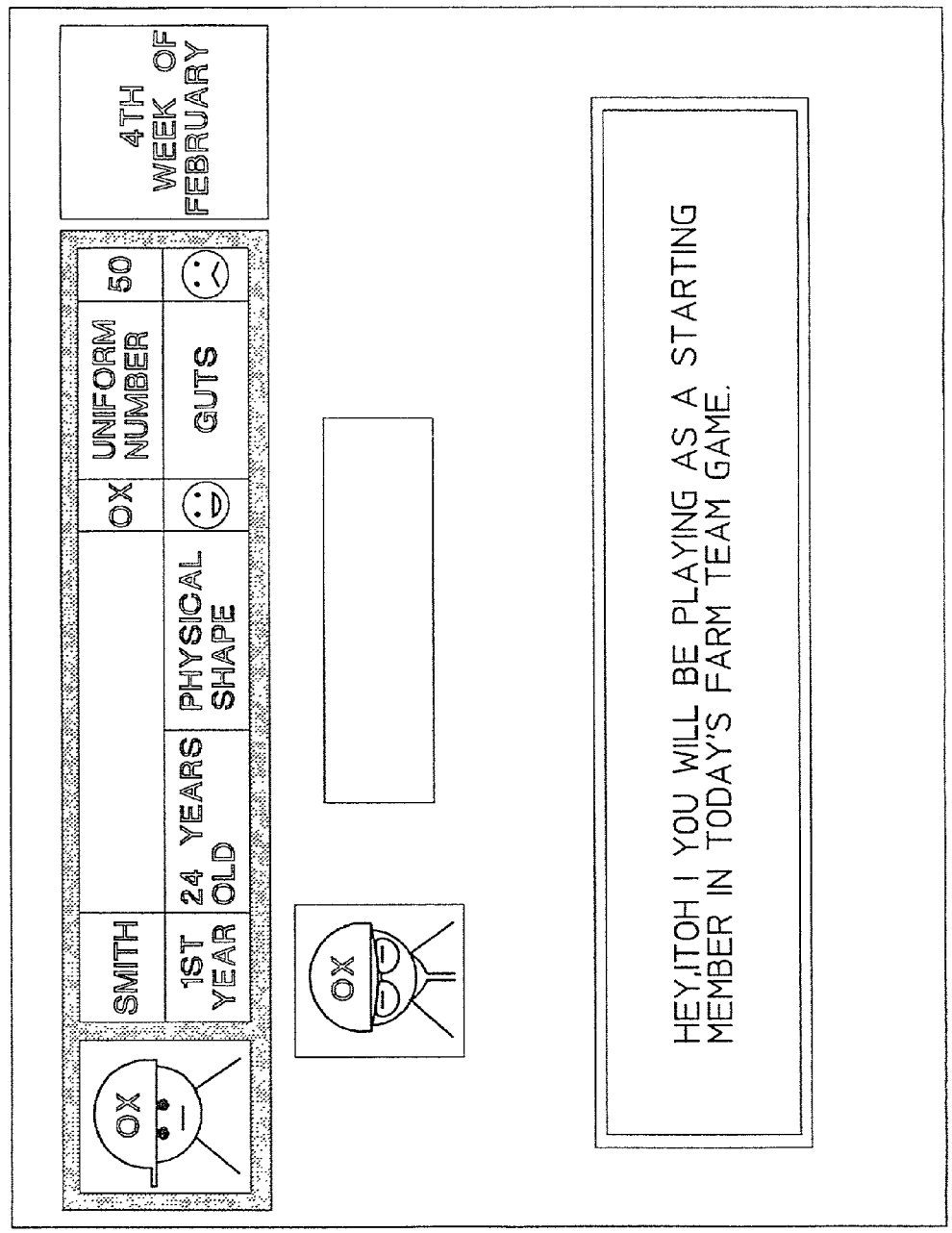
Figure 11:
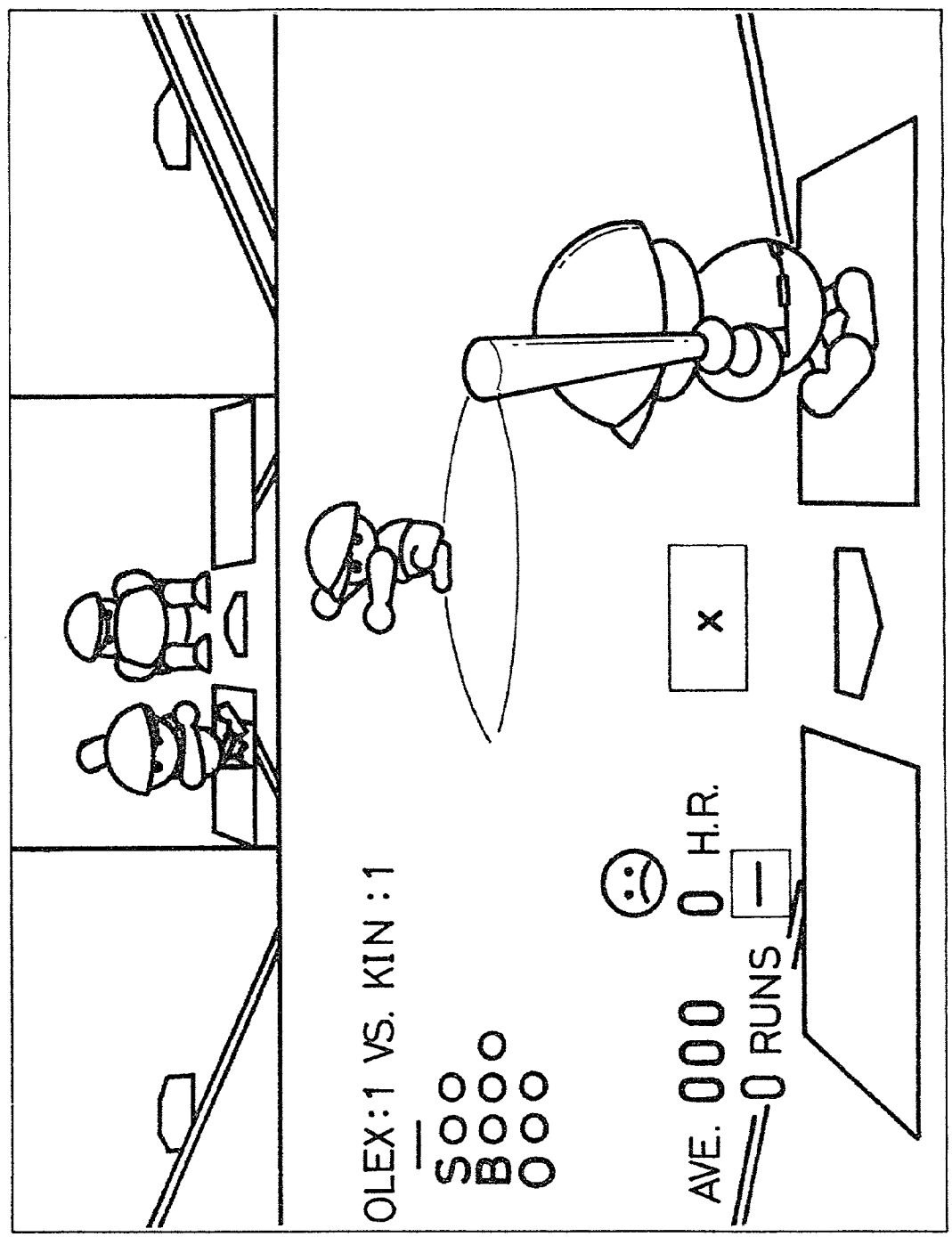

FIG. 10 is a screen showing a case where the coach says to the player to become a starting member of the second team due to his increased evaluation on the player. FIG. 11 is a screen displayed following that of FIG. 10. In FIG. 11, the player participates in the game of the second team as a batter. The more hits the player makes, the better the evaluations of the coach and the manager on him become. FIG. 12 is a screen showing the result of the player made in the game participated as a starting member. Particularly, the evaluations of the coach and the manager decrease upon having a "strikeout", thereby decreasing a chance of participating as a starting member.

Figure 13:
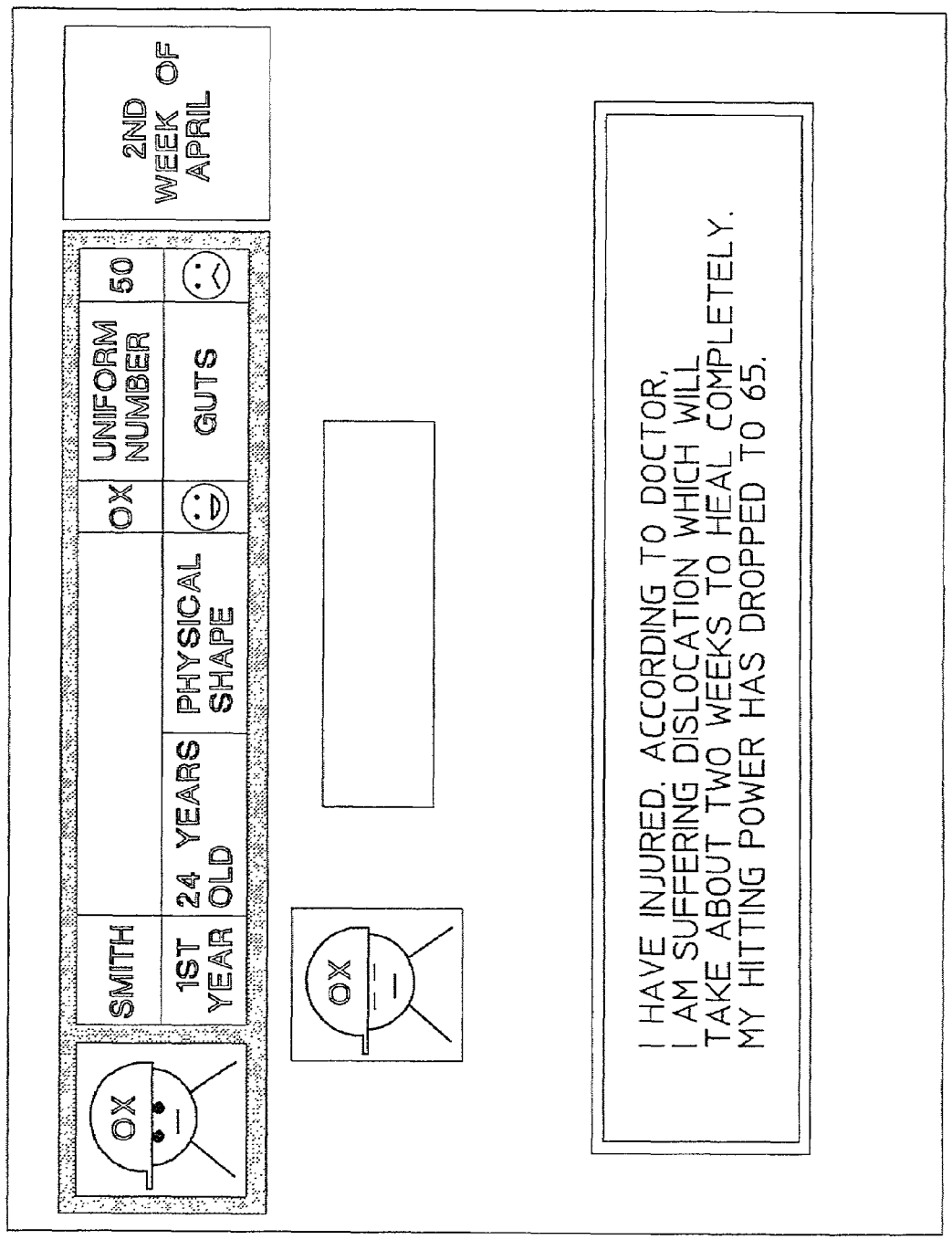

FIG. 13 is a screen showing a case where an injury as a negative event has occurred. FIGS. 14 to 16 are diagrams of screens showing how the "Remaining Experience Points" are allocated to the "Abilities" by the remaining experience point distributor. The screen of FIG. 15 is displayed by scrolling the lower half of a table of FIG. 14. Similar to the cases of FIGS. 14 and 16, the "Remaining Experience Points" can be allocated. "Present Abilities" and "Abilities after Change" are not shown.

Numerical values in tables shown in FIGS. 14 and 15 are the "Remaining Experience Points" necessary to increase "Abilities" by one point. In FIG. 14, there are "Muscular Strength" of 36 points, "Batting Power" of 65 points, and "Ball-Throwing Force" of 8 points. In FIG. 16, if "Batting Power" is increased by 2 points to 67 points and "Ball-Throwing Force" is increased by 1 point to 9 points, the "Remaining Experience Points" are reduced to 4 points (=36-4×2-24). Similarly, "technique" of 44 points in FIG. 14 is reduced to 7 points (=44-5-32) in FIG. 16 by increasing "Ball-Throwing Force" and "Fielding" by 1 point respectively. "Ability" of 65 points is also decreased to 50 points (=65-5-10) by increasing "Ball-Throwing Force" and "Fielding" by 1 point respectively.

Specifically, in the success game, training values which are sums of the training initial values (initial abilities of the object to be trained, etc.) of the player to be trained and later-added values obtained by causing the player to take actions on the monitor 5 in line with the training purpose by operating the specified operation buttons of the operation unit 4. The training of the player is assumed to have been successful if the training values reach values set in advance at the completion of the game. The training values are influenced by the items given to the player during the training process as described above.

Figure 17:
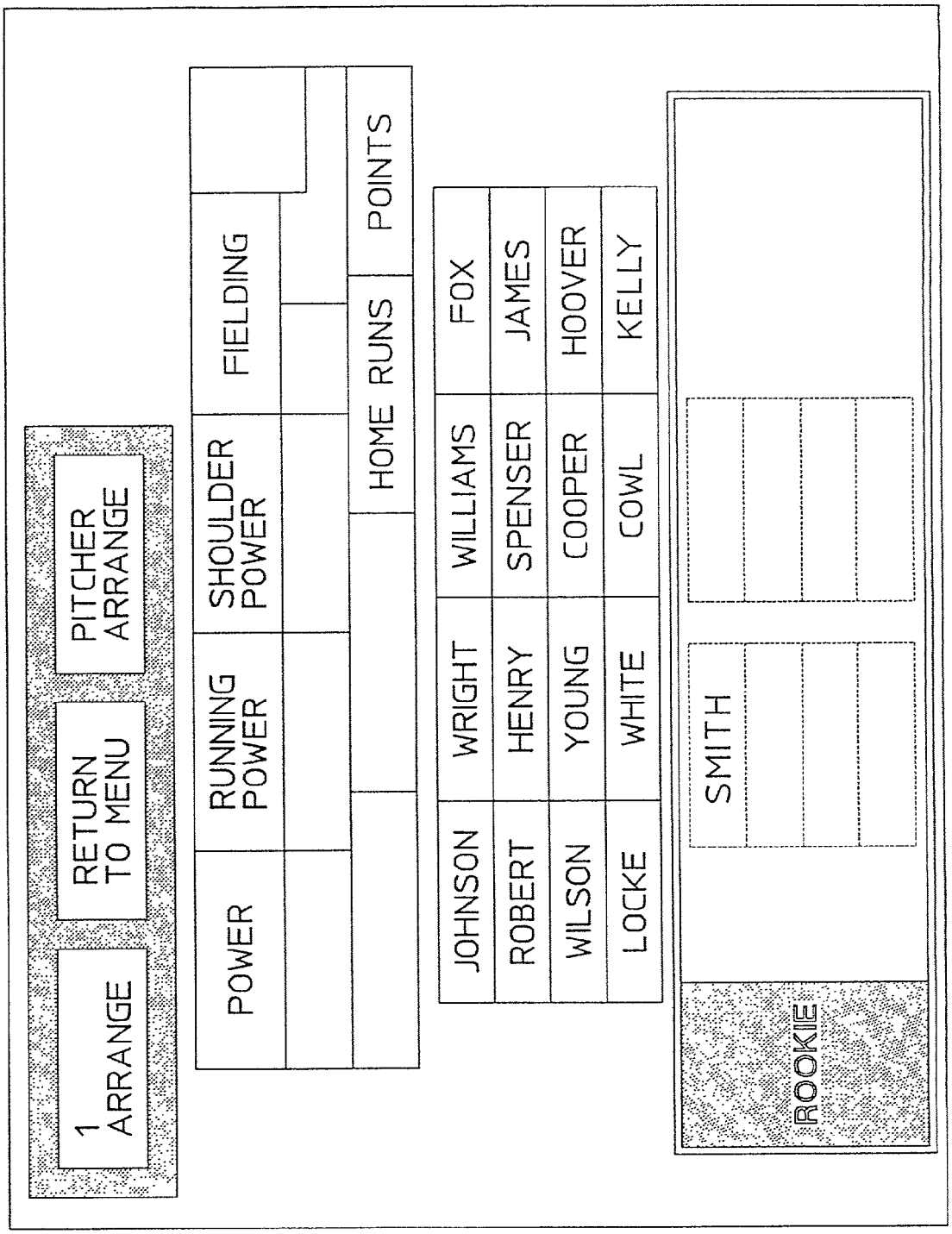

FIG. 17 is a screen used to register specified players as rookie players. If a rookie player is promoted to the first team by the manager, his name is displayed in a square at the lower part of this screen and he can play in the first team. Although not shown, if the grown rookie player is promoted to the first team, he is assumed to be a player who can play in the first team and plays in accordance with his abilities when a competition game is selected on the initial screen. The game player can train rookie players one by one until the number of the trained rookie players reaches a predetermined number.

Specifically, this success game is such that the rookie player is trained to a player having have individual abilities by repeating various practices, other factors and feeling factors (speeches) before the lapse of a specified number of years (e.g. 3 years) after joining the team or through an instruction from the coach to participate as a starting member of the second team, and is finally promoted to the long-cherished first team by the manager. In this embodiment, the player can be retrained in an other video game apparatus having the same or similar construction and owned by a friend or the like by transferring (transmitting) the data of the player trained until being promoted to the first team to the other video game apparatus via a communication cable as described later.

In this case, the player is not transferred to the other video game apparatus while keeping his abilities after the completion of the training, but is transferred thereto with the basic abilities (training initial values) set when he was first registered as a rookie, the items given to him during the training process, and his "girl friend" if he has one in addition to the attributes. In the other video game apparatus to which the data of the player were transferred, the basic abilities (training initial values) set first in the previous video game apparatus, the items given to him during the training process, and his "girl friend" if he has one are treated as training initial values. Thereafter, the player is trained (retrained) by operations similar to the above.

This enables rearing of the player having abilities excellent on sides different from the contents trained by the previous game player, thereby enabling realization of a game having a much more ingenuity than conventional games. Further, the data of the player retrained in the other video game apparatus can be transferred to the previous video game apparatus or still another video game apparatus together with the training initial values in the other video game apparatus, the items further added to the player and the attributes. The transfer number is not particularly restricted. Thus, one player can be trained to a player having excellent abilities while being transferred from one video game apparatus to another many times, with the result that the game has an excellent ingenuity which cannot be found in the conventional games.

Figure 18:
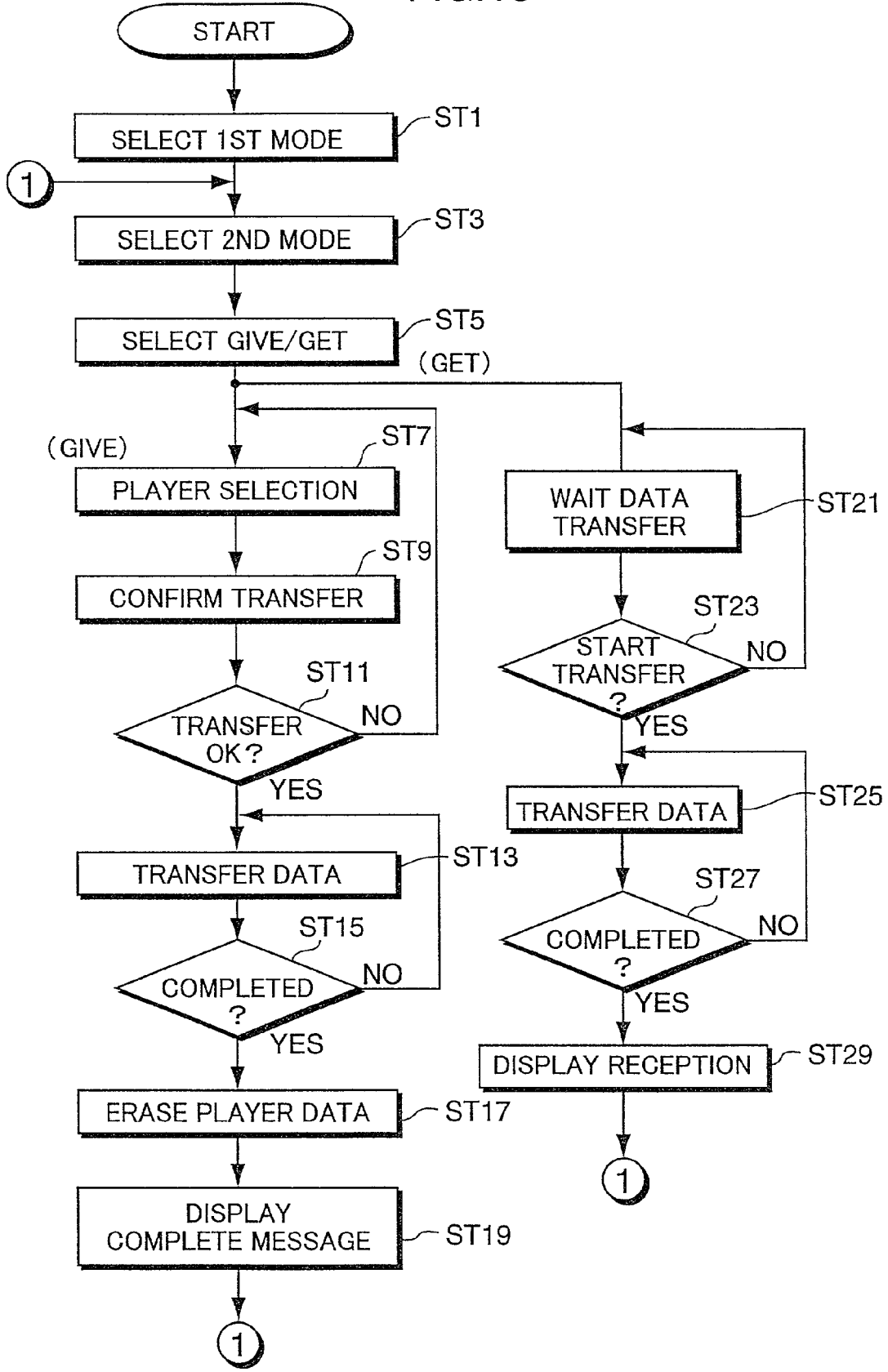
FIG. 18 is a flowchart showing an operation of the video game apparatus shown in FIGS. 1A and 1B.

Next, an operation of transferring the data of the player successfully trained in the video game apparatus 1 to another video game apparatus is described with reference to a flowchart of FIG. 18.

Figure 19:
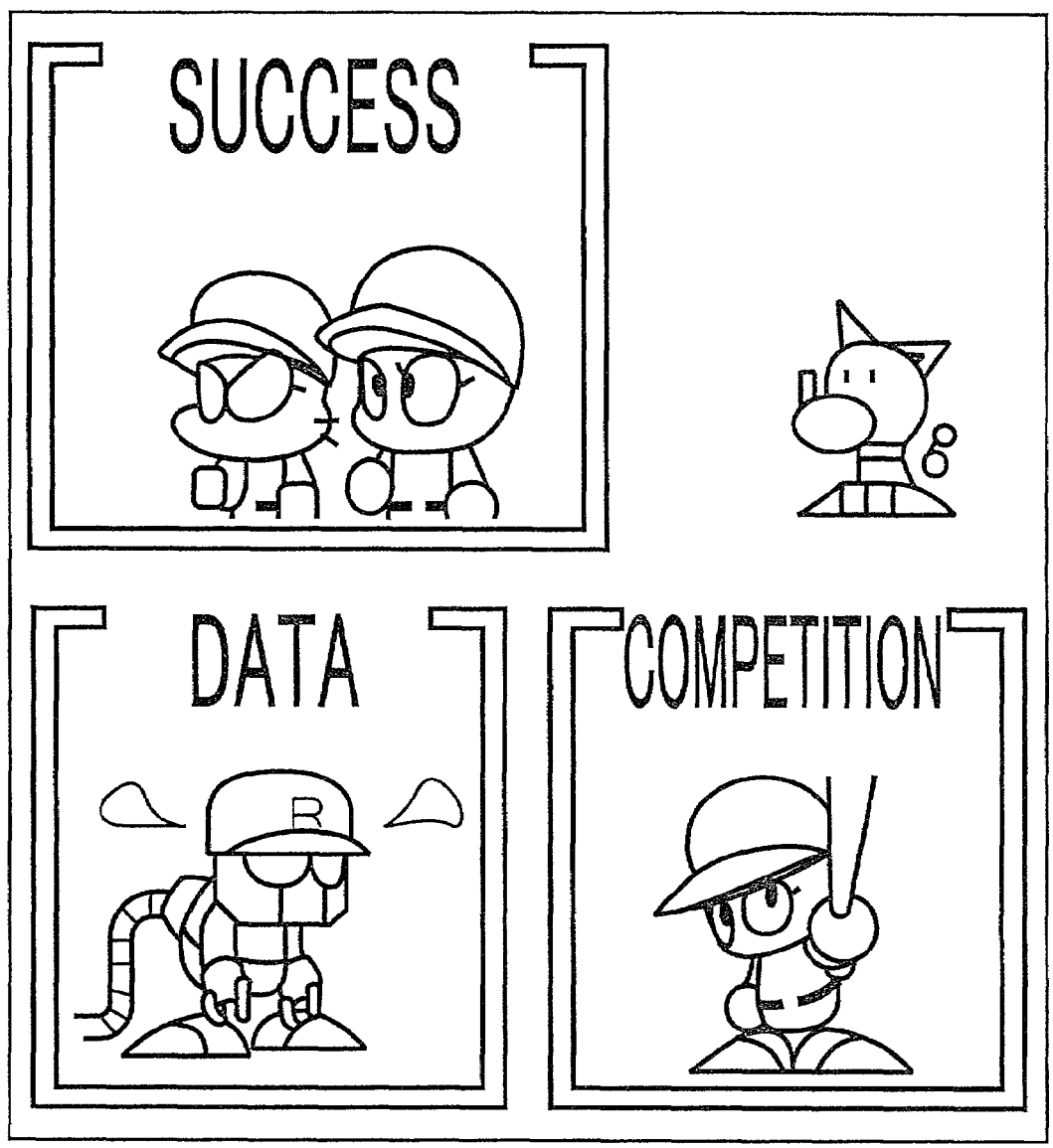
FIGS. 19 to 32 are diagrams showing game screens displayed on a monitor of the video game apparatus shown in FIGS. 1A and 1B.

First, a first mode selection is made on a selection screen displayed on the monitor 5 by operating the specified operation buttons of the operation unit 4 (Step ST1). This selection screen is, for example, constructed as shown in FIG. 19 so that "Success", "Competition" and "Data" are selectable as a game to be played. "Success" is selected when the success game described above is to be played, and "Competition" is selected when a competition game is played between two teams. Further, "Data" is selected to confirm various data of the registered and trained players and various other registered data. In Step ST1, "Data" is selected.

Figure 20:
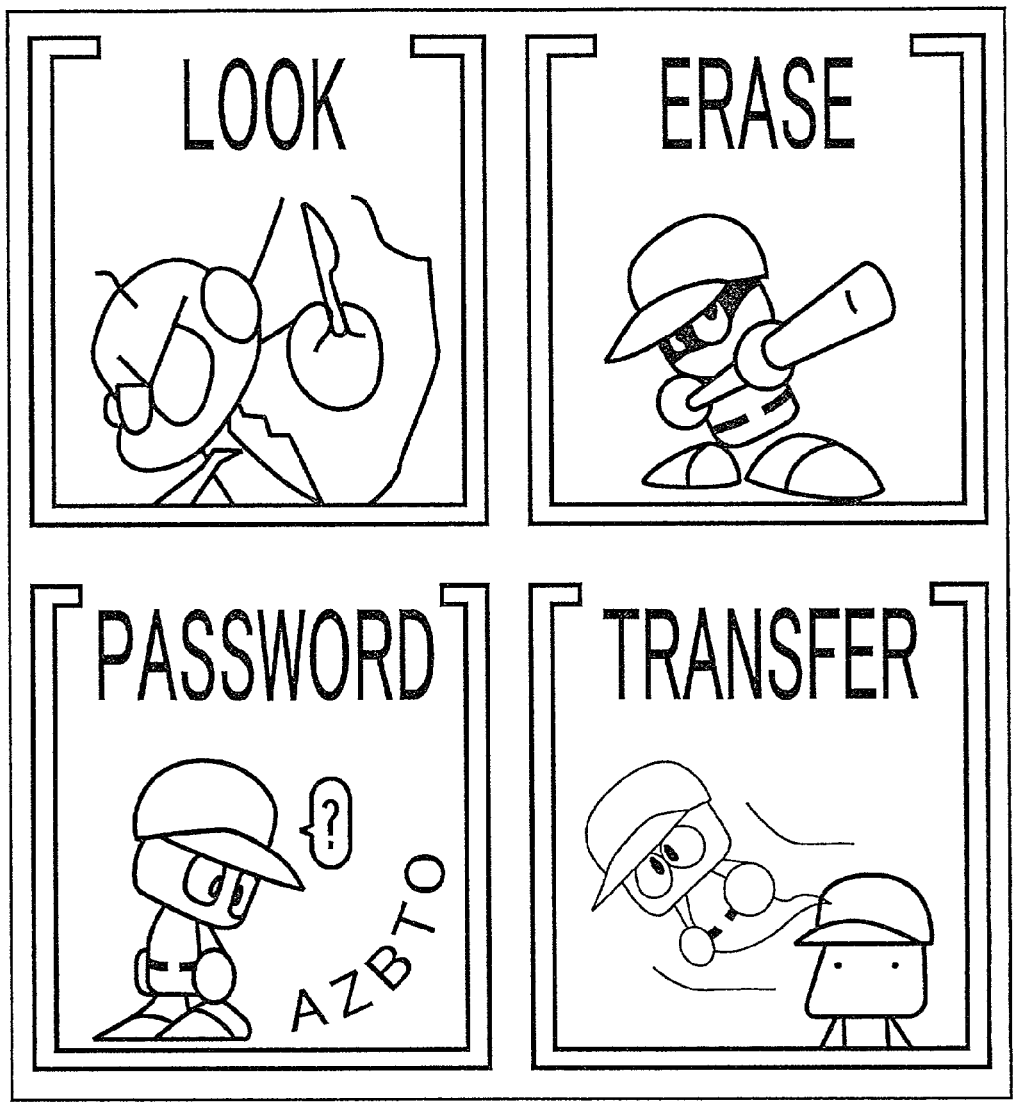

Subsequently, a second mode selection is made on a next selection screen displayed on the monitor 5 by operating the specified operation buttons of the operation unit 4 (Step ST2). This selection screen is, for example, constructed as shown in FIG. 20 so that "Look", "Erase", "Password" and "Transfer" are selectable. "Look" is selected to confirm various registered data. "Erase" is selected to erase various registered data. "Password" is selected to obtain a password necessary to restart an interrupted game. "Transfer" is selected to transfer data of a successfully trained player to another video game apparatus. In Step ST3, "Transfer" is selected.

Figure 21:
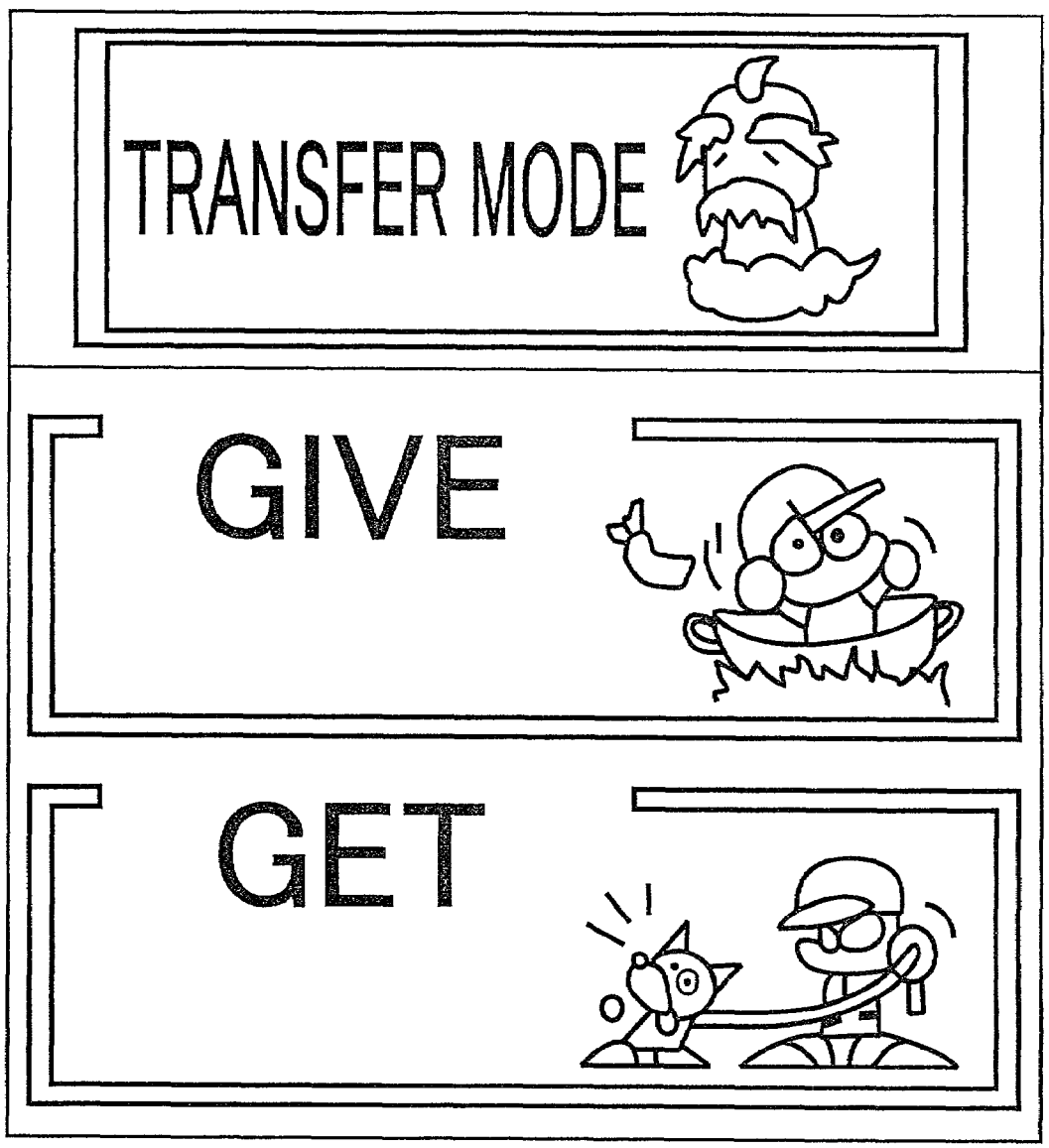

Upon selection of "Transfer", a transfer mode screen as shown in FIG. 21 is, for example, displayed on both transmitting end and receiving end video game apparatus 1. This transfer mode screen is so constructed that "Give" and "Get" are selectable. "Give" is selected in the transmitting end video game apparatus when the data of the trained player are transmitted from this video game apparatus to another. Upon selection of "Give", a reception permission requiring command requiring a reception permission is transmitted from the transmitter 35 to another video game apparatus 1. "Get" is selected in the receiving end video game apparatus when the data of the trained player are received. Upon selection of "Get", a transmission requiring command requiring a transmission is transmitted from the transmitter 35 of the receiving end video game apparatus 1 to the transmitting end video game apparatus 1.

Figure 22:
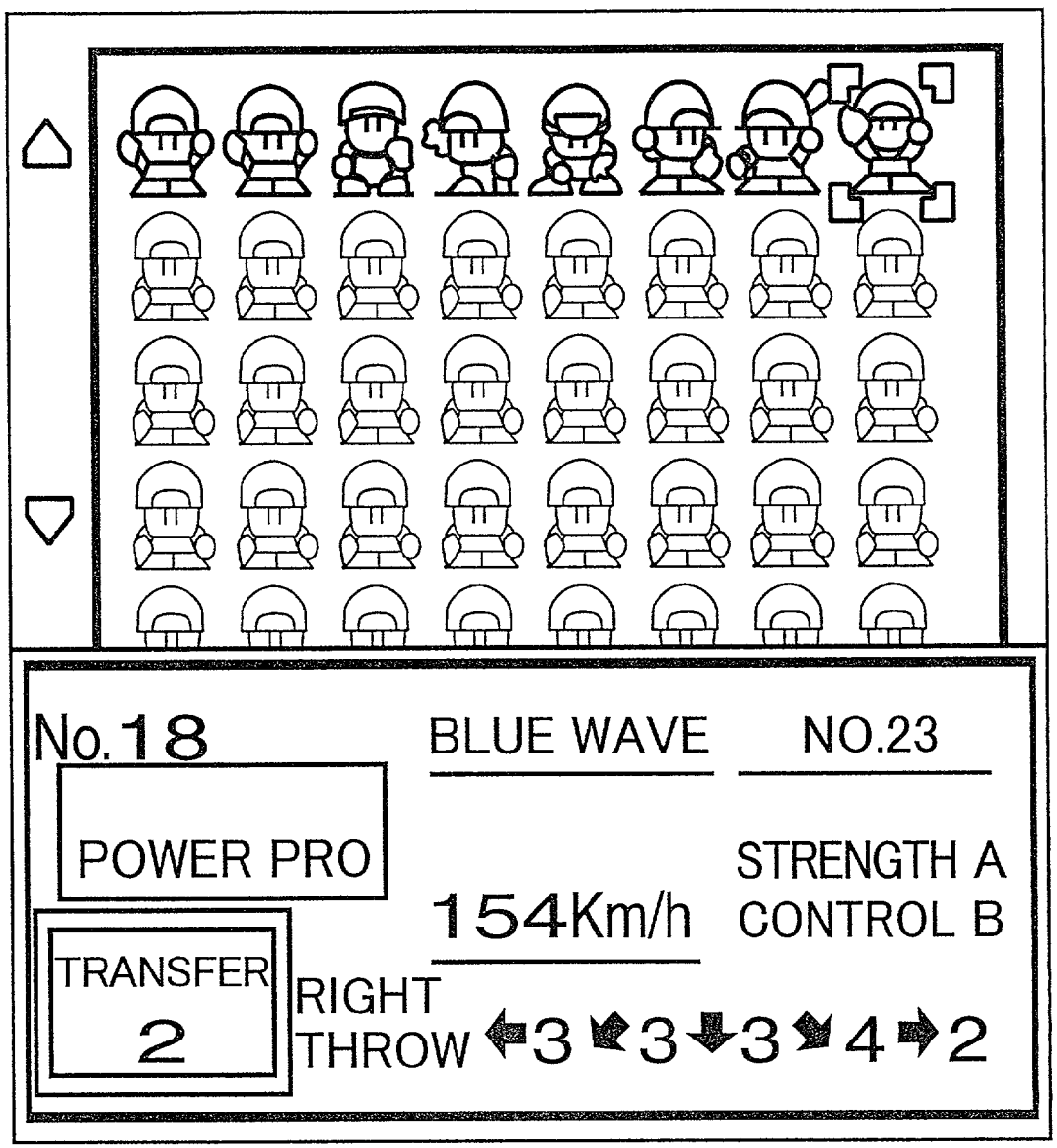

Subsequently, "Give" and "Get" are selected on the transfer mode screens displayed on the monitors 5 by operating the specified operation buttons (Step ST5). Specifically, as described above, "Give" is selected in the transmitting end video game apparatus, and "Get" is selected in the receiving end video game apparatus. At this stage, a player selection screen as shown in FIG. 22 is, for example, displayed. In FIG. 22, players trained by the game player are drawn in bold line.

Subsequently, the player to be transferred is selected from the players trained through the success games on the player selection screen displayed on the monitor 5 by operating the specified operation buttons (Step ST7). More specifically, one player is selected by the cursor from the players indicated in bold line in FIG. 22. In FIG. 22, the player at the upper right end is selected by moving the cursor. At this stage, the basic abilities and attributes (name (Power-Pro), serial No. (No. 18), uniform number (23), transfer number (2), pitching form (right-handed tornado), etc.) of the selected player are displayed in the lower half of FIG. 22.

Figure 23:
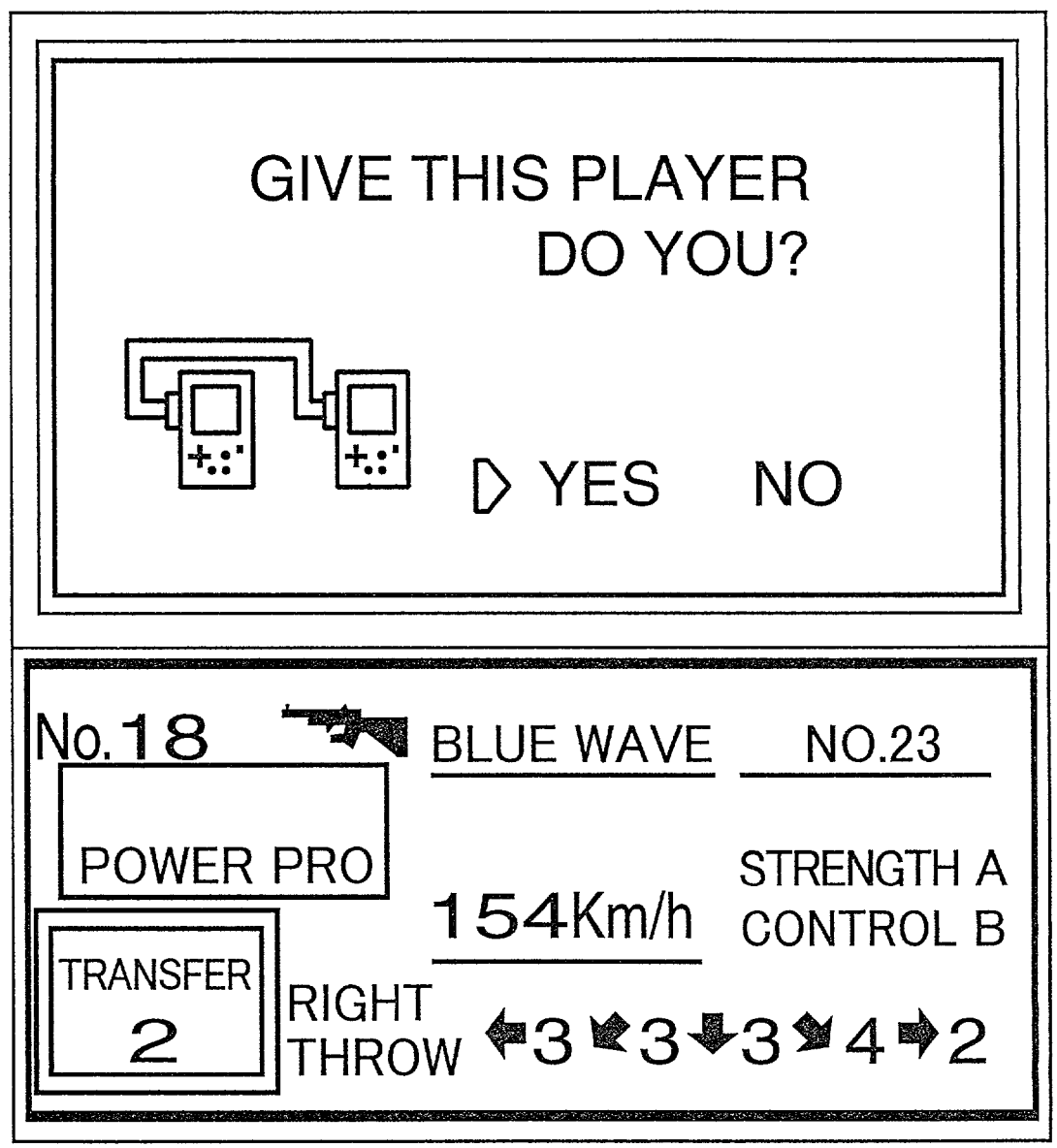

Subsequently, the transfer of the player is confirmed (Step ST9). At this stage, a screen shown in FIG. 23 is, for example, displayed on the monitor 5. On this screen, the player data to be transferred are displayed in the lower half, and a display is made in the upper half to make a "Yes" or "No" selection. "Yes" is selected to instruct a transfer if the player data may be transferred.

Figure 24:
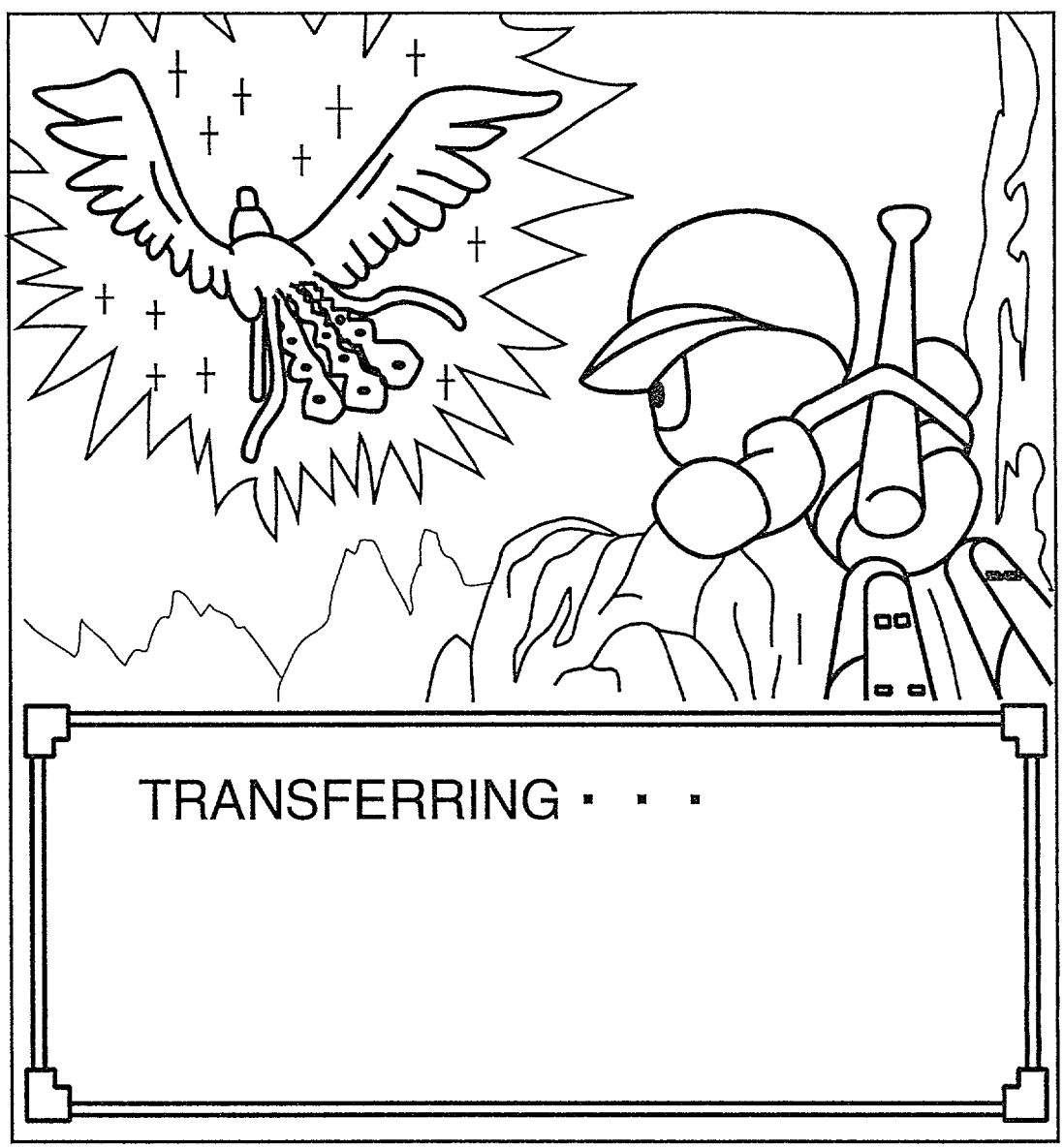

It is then discriminated whether a transfer instruction has been given (Step ST11). This routine waits on standby if the discrimination result is negative, whereas a data transfer is performed (Step ST13) if it is affirmative. At this stage, an ongoing transfer screen as shown in FIG. 24 is, for example, displayed on the monitor 5. The data to be transferred include only the basic abilities and attributes of the player set when he was registered as a rookie, the items given to him during the training process and influential to the training result and his "Girl Friend" (only if he has one). In the present invention, "Girl Friend" is treated as a basic ability.

It is then discriminated whether the data transfer has been completed (Step ST15). This routine waits on standby if the discrimination result is negative, whereas the transferred player data are all erased (Step ST17) if it is affirmative. Upon completion of data erasure, an unillustrated specified transfer completion message is displayed on the monitor 5 (Step ST19), thereby completing the transferring operation.

On the other hand, the receiving end video game apparatus 1 waits on standby until the start of the data transfer (Step ST21) after "Get" is selected in Step ST5 and, then, it is discriminated whether the data transfer has been started (Step ST23). The routine waits on standby until the start of the data transfer if the discrimination result is negative, whereas an ongoing transfer screen is displayed on the monitor 5 (Step ST25) if it is affirmative. This screen is the same as the one shown in FIG. 24 which is displayed in the transmitting end video game apparatus 1.

Figure 25:
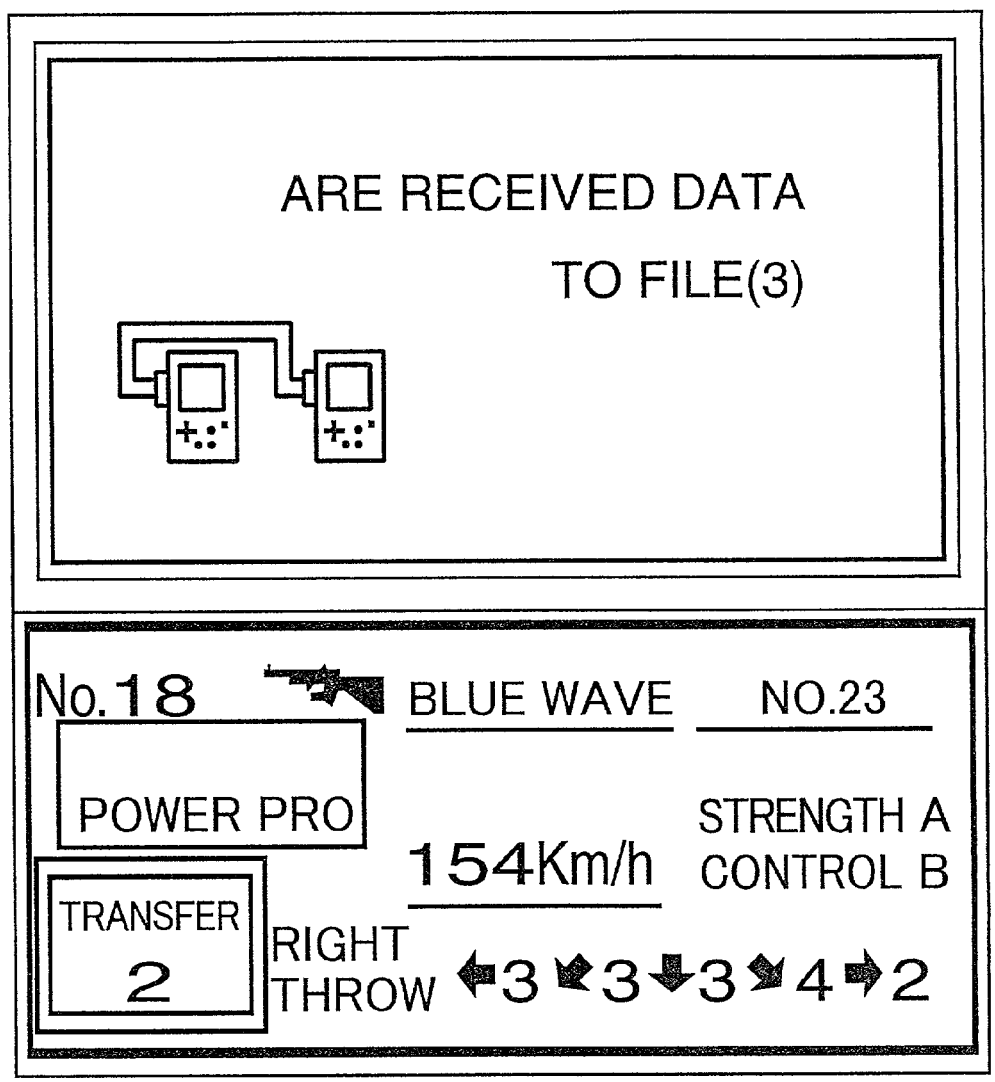

It is then discriminated whether the data transfer has been completed (Step ST27), and a data reception screen is displayed on the monitor 5 (Step ST29) if the discrimination result is affirmative. In this way, the operation in the receiving end video game apparatus 1 is completed. The screen displayed in Step ST29 is, for example, as shown in FIG. 25, wherein a transfer end file number (the received data are transferred to File (3) in FIG. 25) is displayed in the upper half and the transferred player data are displayed in the lower half.

Figure 26:
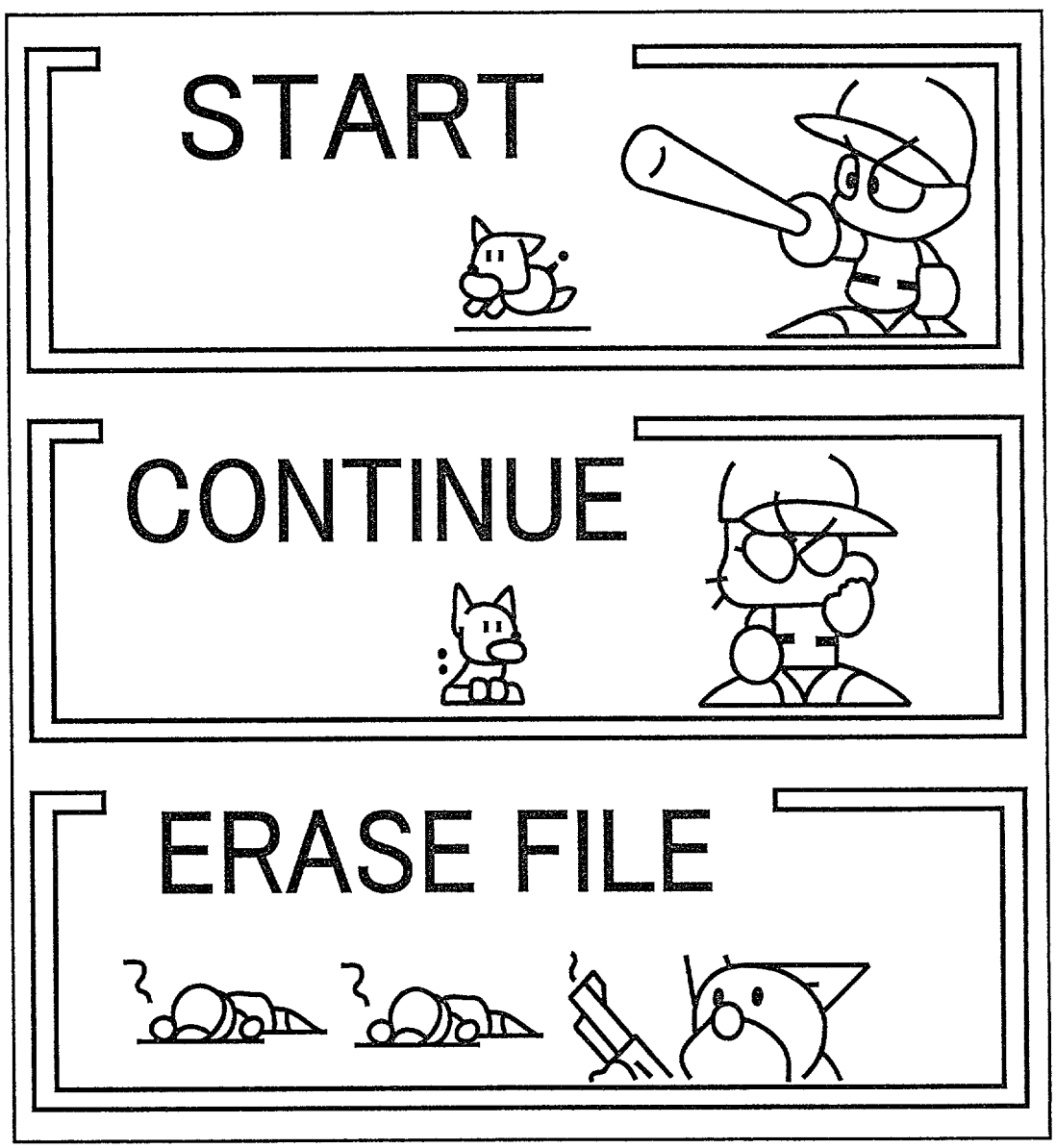
Figure 27:
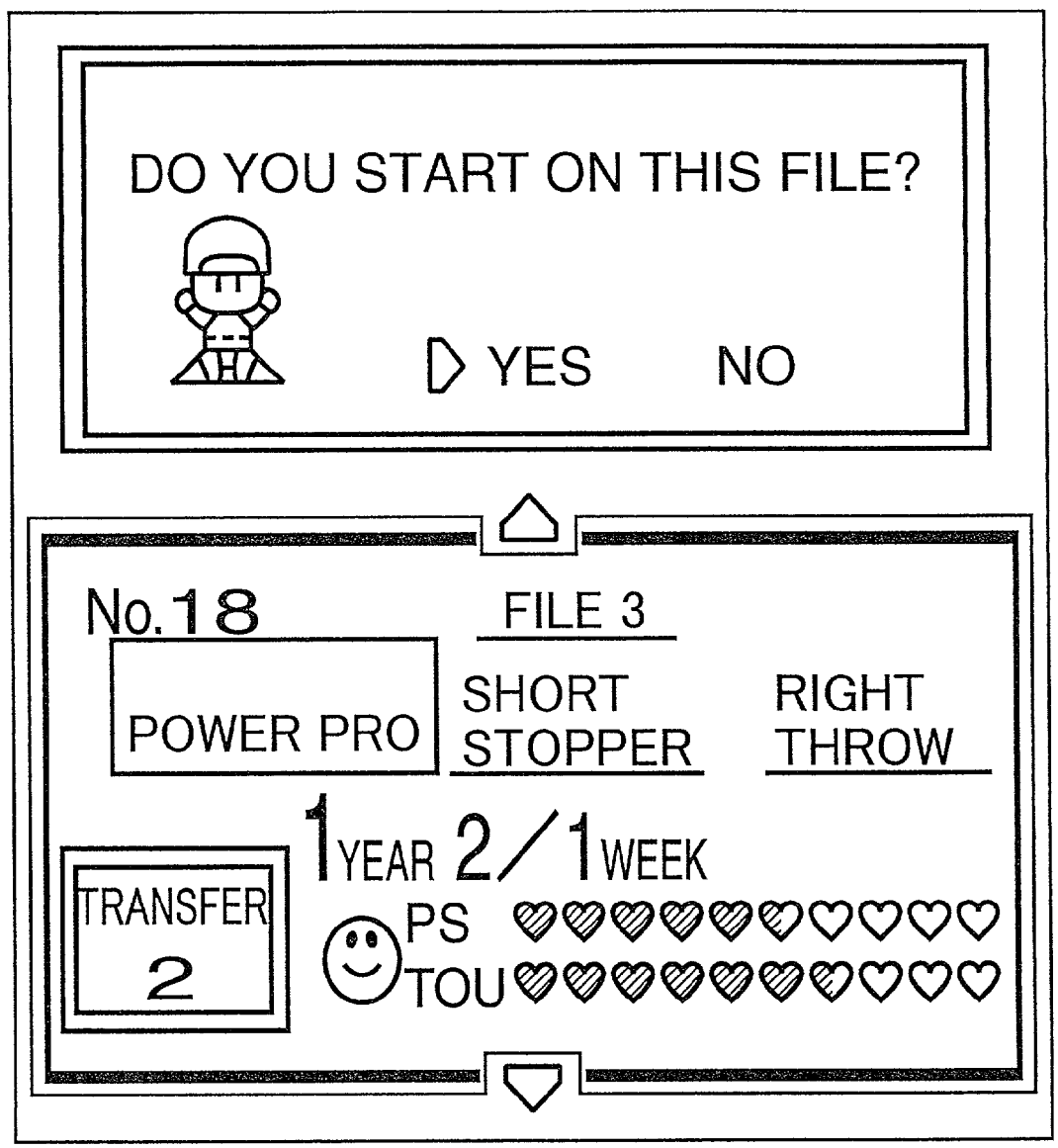

In the receiving end video game apparatus 1, a screen as shown in FIG. 26 is displayed on the monitor 5. In this screen, "Start", "Continue" and "Erase File" are selectably displayed. If "Continue" is selected, a screen as shown in FIG. 27 is displayed. On this screen, a selection display is made in the upper half to make a "Yes" or "No" selection, and the transferred player data are displayed in the lower half. The transferred player can be retrained by selecting "Yes" on the selection screen.

Figure 28:
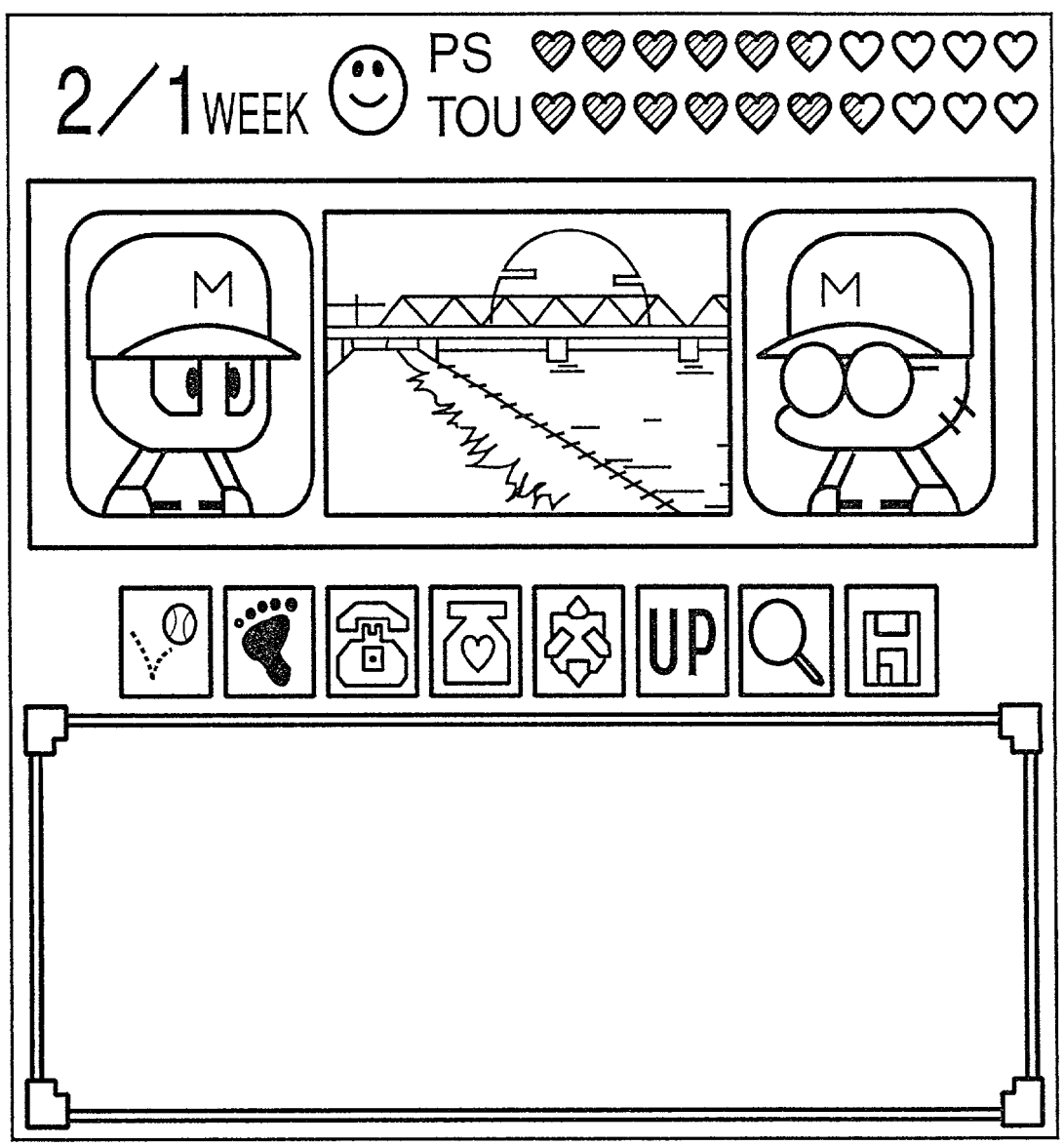

FIG. 28 shows an initial game screen displayed on the monitor 5, and lapse of time by the month and week and "Physical Strength (PS)" and "Toughness (TOU)" levels of the player are displayed at the uppermost part. Here, 1/1 WEEK means the first week of January, and the levels of the players are indicated by the number of painted-over heart marks. In the middle part are displayed the player, a practicing ground and selection icons of "Training", "Telephone" and "Recovery" and the like. The player can be caused to take a specified action by designating a specified selection icon. At the bottommost part is set a display column for messages and contents of speeches, which are displayed if necessary.

Figure 29:
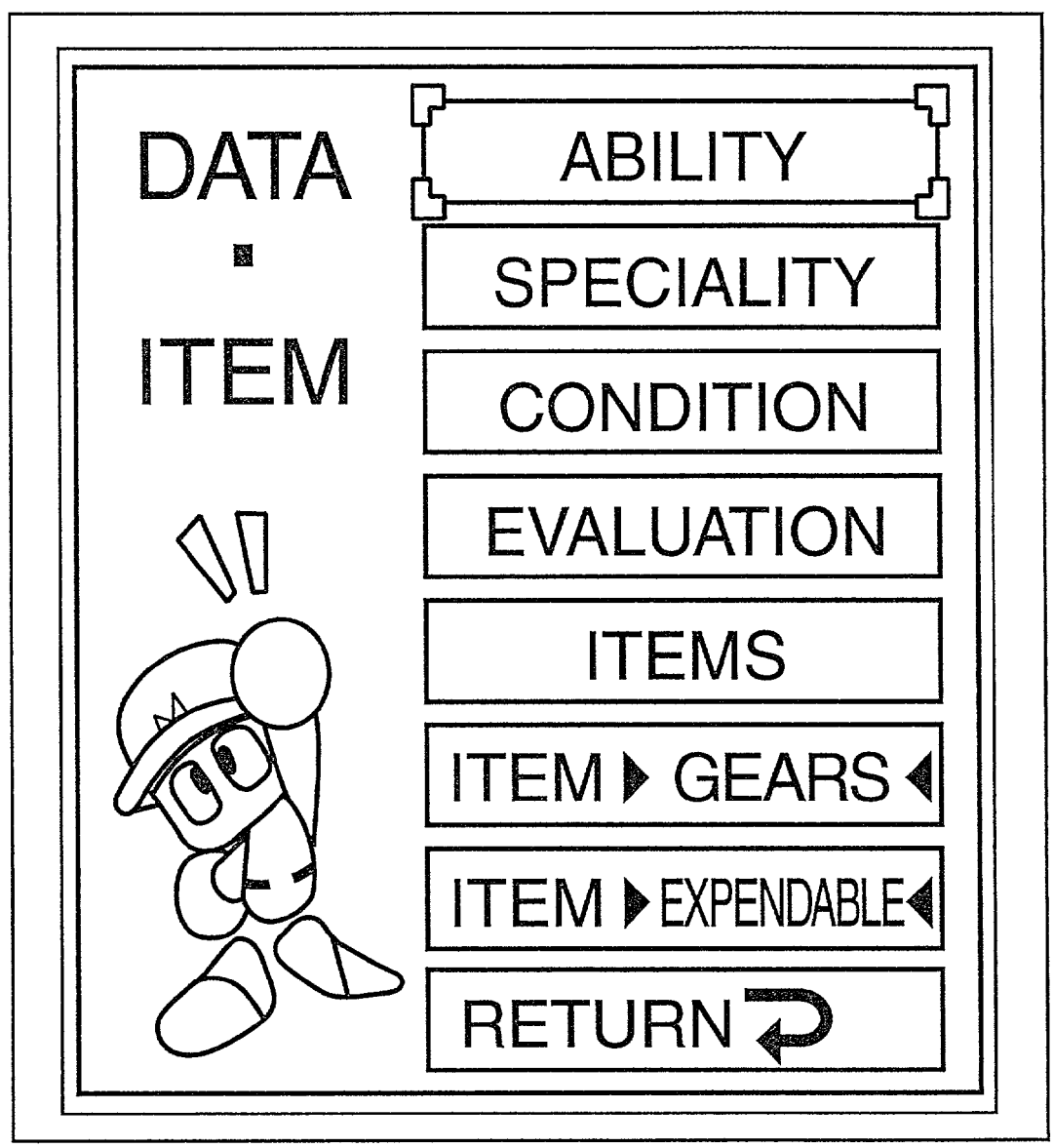
Figure 30:
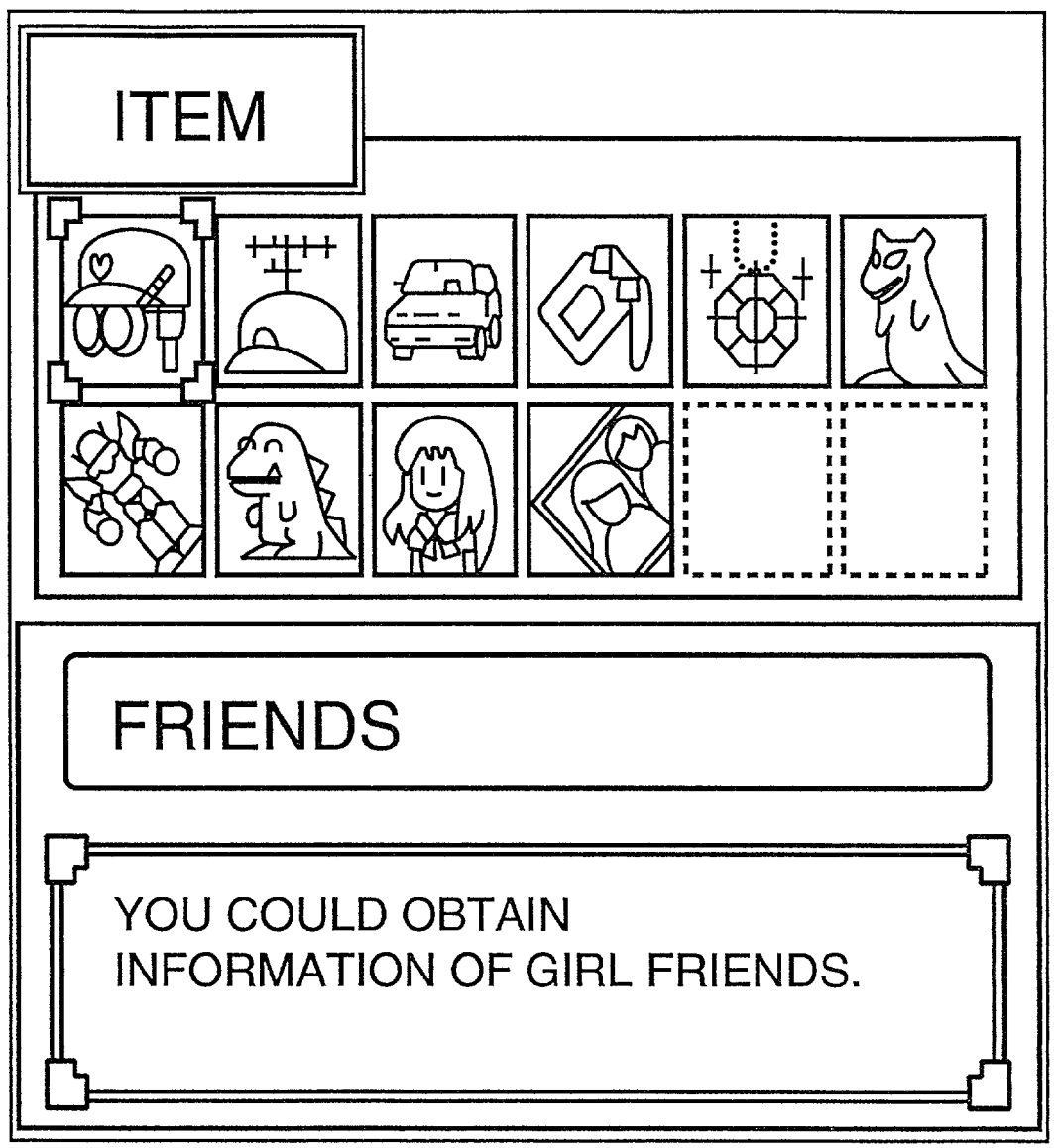

FIG. 29 is a diagram showing a guide screen of "Data" and "Item" displayed on the monitor 5. Individual information and special abilities of the player, the contents of the items, etc. can be confirmed by selecting one of the items displayed along vertical direction. FIG. 30 shows a screen displayed when "Item" is selected on the screen of FIG. 29. "Item" icons are displayed in the upper half, and the name and content corresponding to the "Item" icon designated by moving the cursor are displayed in the lower half.

Figure 31:
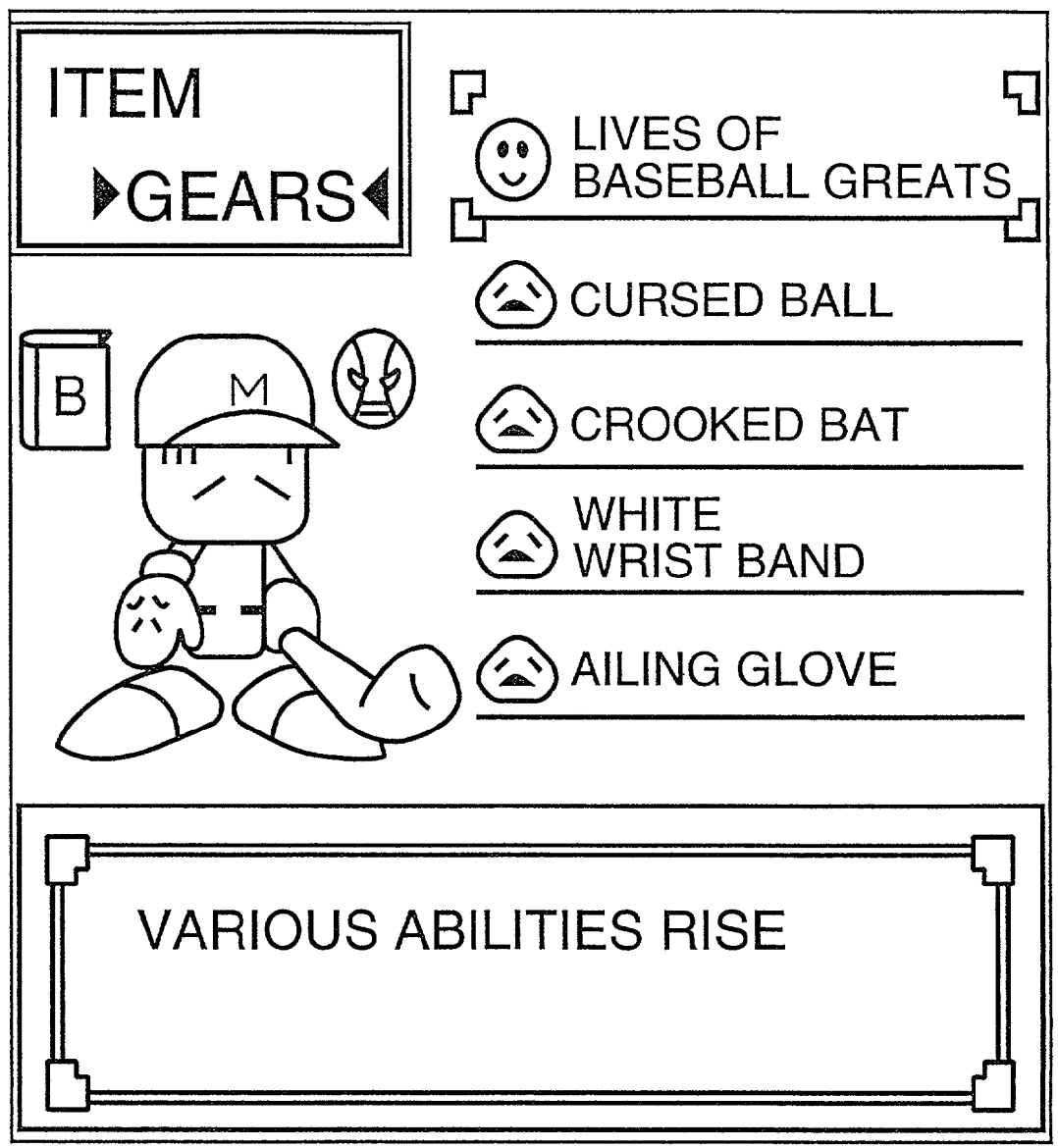
Figure 32:
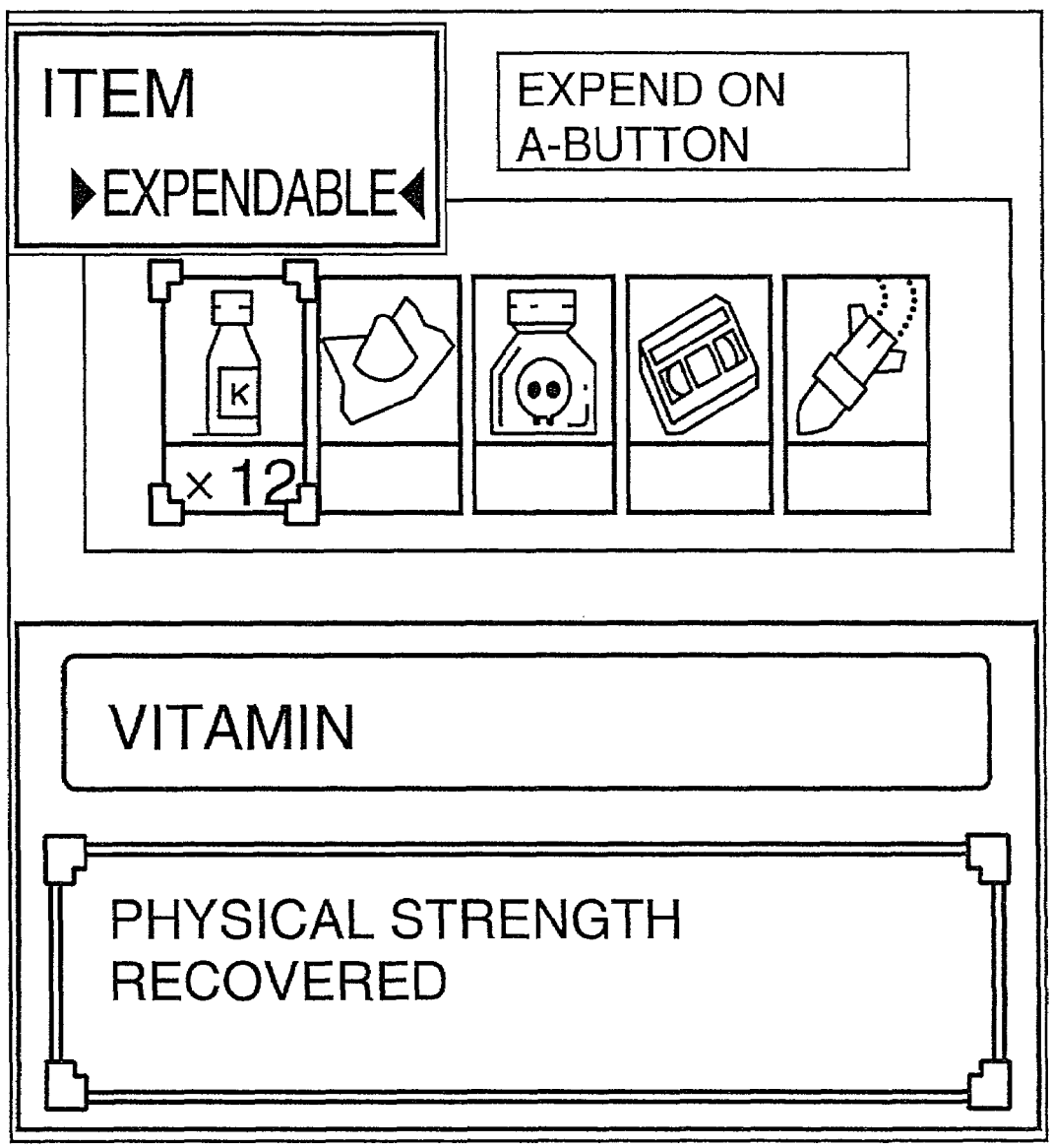

FIG. 31 is a guide screen of gear "Items" displayed on the monitor 5, and the content of the gear influential to the training result of the player is displayed by designating one of the gears displayed along vertical direction by moving the cursor. FIG. 32 is a guide screen of expendable "Items", and the name and content of the expendable "Item" designated from those displayed in the upper half by moving the cursor thereto are displayed.

In the game in which the character training control constructed as above is executed, the rookie player registered by the game player is trained to the degree that he can be active as a first team member after a long series of various practices, whereas the trained player can be retrained by transferring his basic abilities set at first and the items given to him during the training process together with the attributes to another video game apparatus.

Accordingly, the intention of the succeeding game player can be reflected while that of the previous game player is carried on. This enables rearing of the player having excellent abilities on sides different from the contents trained by the previous game player, thereby enabling realization of a game having a much more ingenuity than conventional games. Further, the data of the player retrained in the other video game apparatus can be transferred to the previous video game apparatus or still another video game apparatus together with the training initial values in the other video game apparatus and the items further given to the player. Thus, one player can be reared to a player having excellent abilities on many sides while being transferred from one video game apparatus to another many times, with the result that the game has an excellent ingenuity which cannot be found in the conventional games.

The present invention is not limited to the foregoing embodiment, and various other embodiments as described below may be adopted.

(1) Although the trained player is transferred to another video game apparatus and retrained therein in the foregoing embodiment, he may be retrained in the same video game apparatus without being transferred to another video game apparatus. In such a case, a retraining mode may be set instead of the transfer mode.

Specifically, there may be provided a step of setting a character to be trained and his training initial values when the training mode is instructed, a step of obtaining training values added to the training initial values of the character by causing the set character to take actions on the monitor in line with the training purpose according to the operation of the plurality of operable members, a step of giving a plurality of kinds of items prepared in advance and influential to the addition of the training values in relation to at least one of the trained state of the character and the action instructing operation given to the character by the operable members, a step of judging whether the training has been successful, and a step of setting the character having been successfully trained and provided with the training initial values and the given items as an object when the retraining mode is instructed.

(2) Although the video game apparatus 1 is of the portable type in which the display unit 3 and the operation unit 4 are integrally constructed in the foregoing embodiment, the display unit 3 and the operation unit 4 may be separately constructed. In such a case, a television receiver, a display of a personal computer or the like may be used as the display unit 3.

(3) Although the data of the successfully trained player are transferred to an external side together with the training initial values and the given items when the transfer mode is instructed in the foregoing embodiment, they may be transferred to the external side only with the training initial values. Even in such a case, the player can be trained by the succeeding game player while the intention of the first game player is carried on. Thus, a game having an ingenuity different from conventional games can be realized.

(4) Although the video game apparatus, the character training control method and the readable storage medium storing character training control programs according to the present invention are described as such designed for the baseball game in the foregoing embodiment, the present invention is also applicable to sport games other than the baseball game or games other than sport games. In the case of success games relating to sports, technical abilities in pursuing sports serve as objects to be trained in many cases. However, in the case of other games, negotiation abilities, sales abilities, etc. may serve as objects to be trained. Further, personalities or the like other than the abilities may be objects to be trained.

As described above, the character to be trained and his training initial values are set when the training mode is instructed; training values are obtained which are added to the training initial values of the character by causing the set character to take actions on the monitor in line with the training purpose according to the operation of the plurality of operable members, a plurality of kinds of items are given to the player which are prepared in advance and influential to the addition of the training values in relation to at least one of the trained state of the character and the action instructing operation given to the character by the operable members; whether or not the training has been successful is judged; and the data of the character having been successfully trained are transferred to the external side together with the training initial values when the transfer mode is instructed. Also, in the transfer of data, the given items may be preferably transferred in addition to the training initial values.

Accordingly, the intention of the succeeding game player can be reflected while that of the previous game player is carried on. This enables rearing of the player having excellent abilities on sides different from the contents trained by the previous game player, thereby enabling realization of a game having a much more ingenuity than conventional games.

Further, the character data provided with the training initial values and the given items may be received from the external side, and the received character may be set as an object to be trained when the training mode is instructed. This enables the received character to be retrained, with the result that a game having a better ingenuity than conventional games can be played.

Further, the reception permission requiring command may be sent when the data of the successfully trained character are transmitted to the external side together with the training initial values and the given items. With such an arrangement, the character data can be securely transmitted to the receiving end since it may be done when the reception permission is given from the receiving end.

Further, the transmission requiring command may be sent when the character data provided with the training initial values and the given items are received from the external side. With such an arrangement, the character data transmitted from the transmitting end can be securely received.

Further, items different from those already given to the player can be given when the character received from the external side is trained. This enables rearing of the player having abilities excellent on sides different from the contents trained by the previous game player.

Further, how many times the same character has been transmitted to the external side may be displayed on the monitor in the transfer mode. With such an arrangement, the transfer number of the character can be known and used as a reference in progressing the game.

Further, another video game program executable using one or more successfully trained characters may be provided. With such a program, a game can be more interesting since it can be progressed by the players trained by the game player.

Further, the data of the successfully trained character may be transferred to the external side only with the training initial values. Even in this case, the character can be trained by the succeeding game player while the intention of the previous game player is carried on. This enables rearing of the character on which the intentions of a plurality of game players are reflected. Therefore, a game having an excellent ingenuity which cannot be found in the conventional games can be played.

This application is based on patent application No. 11-355202 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A video game apparatus, comprising:
   a monitor for displaying game images;
   a plurality of operable members for operating the game images including a character displayed on the monitor;
   a data transmitter for transmitting data to a second video game apparatus;
   a mode instructing member for selectively instructing a training mode and a transfer mode;
   a first setter for setting a character to be trained and training initial values thereof when the training mode is instructed, each of said training initial values reflecting at least one aspect of basic abilities of the character;
   a training controller for obtaining training values to be added to the training initial values of the set character in accordance with actions taken by the character in line of a training purpose in response to the operation of the plurality of operable members;
   an item giving device for giving a plurality of kinds of items to the character which are prepared in advance and influential to sums of the training values in relation to at least one of the trained state of the character and action instructing operations given to the character by the operable members, the item having influence on the character when the item belongs to the character;
   a judger for judging whether training has been successful, said data transmitter transmitting character data of the character to the second video game apparatus when a transfer mode is instructed and when judged by the judger as having been successfully trained, said character data of the character to be transmitted including the training initial values of the character and the items given during the training such that a user of the second game device can begin training of the character with said training initial values and said items.

2. A video game apparatus according to claim 1, further comprising:
   a data receiver for receiving the character data corresponding with the training initial values and the given items from the second video game apparatus; and
   a second setter for setting the character received from the second video game apparatus by the data receiver as an object to be trained.

3. A video game apparatus according to claim 1, wherein the data transmitter transmits said data wirelessly.

4. A video game apparatus according to claim 3, wherein the data transmitter transmits said data with infrared signals.

5. A video game apparatus according to claim 1, wherein the data transmitter transmits said data with infrared signals.

6. A video game apparatus according to claim 1, wherein the data transmitter transmits said data through a cable.

7. A video game apparatus according to claim 1, further comprising a probability changer for setting a probability for a plurality of remaining experience points.

8. A character training control method for training a character by operating game images including a character displayed on a monitor of a first video game apparatus by a plurality of operable members, comprising the steps of:
   setting a character to be trained and training initial values thereof when a training mode is instructed, each of said training initial values reflecting at least one aspect of basic abilities of the character;
   obtaining training values to be added to the training initial values of the character in accordance with actions taken by the character on the monitor in line with a training purpose in response to the operation of the plurality of operable members;
   giving a plurality of kinds of items to the character which are prepared in advance and influential to sums of the training values in relation to at least one of the trained state of the character and action instructing operations given to the character by the operable members, the item having influence on the character when the item belongs to the character;
   judging whether training has been successful; and
   transferring character data of the character to a second video game apparatus when a transfer mode is instructed and when judged by the judger as having been successfully trained, said character data to be transferred including the training initial values of the character and the items given during the training such that a user on the second video game apparatus can begin training of the character with said training initial values and said items.

9. A character training control method according to claim 8, further comprising the steps of:
   receiving the character data corresponding with the training initial values and the given items from the second video game apparatus; and
   setting the received character as an object to be trained when the training mode is instructed.

10. A character training control method according to claim 8, wherein said character data is transferred wirelessly.

11. A character training control method according to claim 10, wherein said character data is transferred with infrared signals.

12. A character training control method according to claim 8, wherein said character data is transferred with infrared signals.

13. A character training control method according to claim 8, wherein said character data is transferred through a cable.

14. A character training control method according to claim 8, further comprising setting a probability for a plurality of remaining experience points.

15. A character training control method according to claim 8, further comprising the steps of:
   receiving the character data corresponding with the training initial values and the given items by the second video game apparatus;
   setting the received character as an object to be trained when the training mode is instructed; and
   retraining the received character with said second video game apparatus based upon said training initial values and said given items.

16. A readable storage medium storing a video game program, the video game program being a character training control program comprising the steps of:
   setting a character to be trained and training initial values thereof when a training mode is instructed, each of said training initial values reflecting at least one aspect of basic abilities of the character;

obtaining training values to be added to the training initial values of the character in accordance with actions taken by the character on the monitor of a first video game apparatus in line with a training purpose in response to the operation of the plurality of operable members;

giving a plurality of kinds of items to the character which are prepared in advance and influential to sums of the training values in relation to at least one of the trained state of the character and action instructing operations given to the character by the operable members, the items having influence on the character when the item belongs to the character;

judging whether training has been successful; and transferring character data of the character to a second video game apparatus when a transfer mode is instructed and when judged by the judger as having been successfully trained, said character data to be transferred including the training initial values and the items given during the training such that a user second video game apparatus can begin training the character with said training initial values and said items.

17. A readable storage medium according to claim 16, wherein the character training control program further comprising the steps of:

receiving character data corresponding with the training initial values from the second video game apparatus; and setting the character received as an object to be trained when the training mode is instructed.

18. A readable storage medium according to claim 17, wherein the character training control program further comprises the step of displaying, on the monitor, how many times a same character has been transmitted to the second video game device in the transfer mode.

19. A readable storage medium according to claim 17, further comprising another video game program executable using at least one successfully trained character.

20. A readable storage medium according to claim 16, the character training control program further comprising the step of transmitting a reception permission requiring command when the character data of the successfully trained character are transmitted to the second video game apparatus together with the training initial values.

21. A readable storage medium according to claim 20, wherein the character training control program further comprises the step of transmitting a transmission requiring command when the character data of a character provided with the training initial values thereof are received from the second video game device.

22. A readable storage medium according to claim 16, wherein the character training control program further comprising the steps of:

receiving character data provided with the training initial values and the given items from the second video game apparatus; and setting the received character as an object to be trained when the training mode is instructed.

23. A readable storage medium according to claim 16, wherein the character training control program further comprising the step of transmitting a reception permission requiring command when the character data of the successfully trained character are transmitted to the second video game apparatus together with the training initial values and the items.

24. A readable storage medium according to claim 23, wherein the character training control program further comprising the step of transmitting a transmission requiring command when character data of a character provided with the training initial values thereof and the items are received from the second video game apparatus.

25. A readable storage medium according to claim 16, wherein other items different from those already given are given to the character when the character received from the second video game apparatus is trained.

26. A readable storage medium according to claim 16, wherein the character training control program further comprises the step of displaying, on the monitor, how many times a same character has been transmitted to the second video game apparatus in the transfer mode.

27. A readable storage medium according to claim 16, further comprising another video game program executable using at least one successfully trained character.

28. A character training control program according to claim 16, wherein said character data is transferred wirelessly.

29. A character training control program according to claim 28, wherein said character data is transferred with infrared signals.

30. A character training control program according to claim 16, wherein said character data is transferred with infrared signals.

31. A character training control program according to claim 16, wherein said character data is transferred through a cable.

32. A character training control program according to claim 16, further comprising setting a probability for a plurality of remaining experience points.

* * * * *